(12) United States Patent
Choudhury et al.

(10) Patent No.: US 9,143,973 B2
(45) Date of Patent: *Sep. 22, 2015

(54) PRIORITIZING MULTIPLE CHANNEL STATE INFORMATION (CSI) REPORTING WITH CARRIER AGGREGATION

(71) Applicant: Sharp Kabushiki Kaisha, Osaka-shi, Osaka (JP)

(72) Inventors: Sayantan Choudhury, Vancouver, WA (US); Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,506

(22) Filed: Feb. 3, 2014

(65) Prior Publication Data
US 2014/0140281 A1    May 22, 2014

Related U.S. Application Data

(63) Continuation of application No. 13/026,090, filed on Feb. 11, 2011, now Pat. No. 8,681,627, which is a continuation-in-part of application No. 12/962,515, filed on Dec. 7, 2010.

(51) Int. Cl.
*H04L 12/26* (2006.01)
*H04W 4/00* (2009.01)
(Continued)

(52) U.S. Cl.
CPC .............. *H04W 24/10* (2013.01); *H04L 1/003* (2013.01); *H04L 1/0027* (2013.01); *H04L 5/001* (2013.01);
(Continued)

(58) Field of Classification Search
CPC ... H04L 1/0026; H04L 1/0027; H04L 1/0029; H04L 1/003; H04L 1/0031; H04L 1/1671; H04L 1/1812; H04L 1/1854; H04L 1/1887; H04L 5/0023; H04L 5/0053; H04L 5/0057; H04L 5/0064; H04L 5/001; H04L 1/00; H04L 1/0015; H04L 1/002; H04L 1/0023; H04L 5/0007; H04L 5/0048; H04L 5/0087; H04L 5/006; H04L 5/0073; H04L 5/0092; H04L 5/0094; H04L 27/2613; H04L 41/0853; H04L 47/14; H04L 47/20; H04L 47/805; H04L 67/322; H04L 2025/03426; H04B 7/0626; H04B 7/0632; H04W 8/22; H04W 24/10; H04W 28/04; H04W 28/044; H04W 36/30; H04W 40/00; H04W 40/246; H04W 72/082; H04W 72/085; H04W 72/1242; H04W 88/08; H04W 28/0231; H04W 28/0273; H04W 28/10; H04W 36/08; H04W 36/18; H04W 36/26; H04W 48/00; H04W 48/06; H04W 48/16; H04W 48/18; H04W 52/244; H04W 72/0406; H04W 72/0446; H04W 72/048; H04W 72/1226; H04W 72/1231; H04W 72/1247; H04W 72/1268; H04W 72/1284; H04W 74/004; H04W 74/0875; H04W 76/02
USPC ......... 370/310–350, 229–238, 252, 400–401, 370/431, 437, 464; 455/63.1, 67.13, 114.2, 455/115.1, 422.1, 449–466, 501, 512
See application file for complete search history.

(56) References Cited

U.S. PATENT DOCUMENTS 7,551,898 B2   6/2009   Gaal et al.
7,649,960 B2   1/2010   Raghavan et al.
(Continued)

OTHER PUBLICATIONS

Office Action issued for U.S. Appl. No. 12/962,515 on Aug. 8, 2014.
(Continued)

*Primary Examiner* — Tri H Phan
(74) *Attorney, Agent, or Firm* — Austin Rapp & Hardman

(57) ABSTRACT

A method for reporting uplink control information (UCI) on a user equipment (UE) is described. Multiple channel state information (CSI) reports are generated for multiple component carriers (CCs) that are scheduled to be transmitted in a subframe. A method of prioritization for the CSI reports is selected. A highest priority CSI report of the multiple CSI reports is determined using the selected method of prioritization. The highest priority CSI report is transmitted.

4 Claims, 14 Drawing Sheets

(51) Int. Cl.
  *H04L 12/28* (2006.01)
  *H04W 72/00* (2009.01)
  *H04W 24/10* (2009.01)
  *H04L 1/00* (2006.01)
  *H04L 5/00* (2006.01)
  *H04W 28/04* (2009.01)
  *H04W 88/08* (2009.01)
  *H04L 1/18* (2006.01)

(52) U.S. Cl.
  CPC ............ *H04L 5/0053* (2013.01); *H04L 5/0064* (2013.01); *H04W 28/044* (2013.01); *H04W 88/08* (2013.01); *H04L 1/0031* (2013.01); *H04L 1/1861* (2013.01); *H04L 5/0023* (2013.01)

(56) References Cited

U.S. PATENT DOCUMENTS

| | | | |
|---|---|---|---|
| 7,656,843 | B2 | 2/2010 | Puig-Oses et al. |
| 7,773,699 | B2 | 8/2010 | Jia et al. |
| 8,145,271 | B2* | 3/2012 | Ishii .................... 455/561 |
| 8,325,666 | B2* | 12/2012 | Miki et al. ............. 370/329 |
| 8,559,328 | B2 | 10/2013 | Tan et al. |
| 8,625,513 | B2* | 1/2014 | Seo et al. .............. 370/329 |
| 8,681,627 | B2* | 3/2014 | Choudhury et al. ..... 370/235 |
| 8,737,504 | B2* | 5/2014 | Liu et al. .............. 375/267 |
| 8,761,062 | B2* | 6/2014 | Chandrasekhar et al. .... 370/310 |
| 8,811,249 | B2* | 8/2014 | Seo et al. .............. 370/311 |
| 8,995,373 | B2* | 3/2015 | Yang et al. ............. 370/329 |
| 9,019,983 | B2* | 4/2015 | Maeda et al. ........... 370/437 |
| 2008/0101280 | A1 | 5/2008 | Gholmieh et al. |
| 2009/0316811 | A1 | 12/2009 | Maeda et al. |
| 2010/0098012 | A1 | 4/2010 | Bala et al. |
| 2010/0105390 | A1 | 4/2010 | Ishii |
| 2011/0080965 | A1 | 4/2011 | Liu et al. |
| 2011/0176478 | A1 | 7/2011 | Inohiza |
| 2011/0205981 | A1 | 8/2011 | Koo et al. |
| 2011/0242982 | A1 | 10/2011 | Lunttila et al. |
| 2011/0243066 | A1 | 10/2011 | Nayeb Nazar et al. |
| 2011/0249578 | A1 | 10/2011 | Nayeb Nazar et al. |
| 2011/0249584 | A1 | 10/2011 | Barbieri et al. |
| 2011/0305161 | A1 | 12/2011 | Ekpenyong et al. |
| 2011/0310821 | A1 | 12/2011 | Kim et al. |
| 2011/0319068 | A1 | 12/2011 | Kim et al. |
| 2012/0033628 | A1 | 2/2012 | Eriksson et al. |
| 2012/0039252 | A1* | 2/2012 | Damnjanovic et al. ....... 370/328 |
| 2012/0063500 | A1 | 3/2012 | Wang et al. |
| 2012/0076028 | A1 | 3/2012 | Ko et al. |
| 2012/0092989 | A1 | 4/2012 | Baldemair et al. |
| 2012/0099527 | A1* | 4/2012 | Ishii ...................... 370/328 |
| 2012/0106437 | A1 | 5/2012 | Seo et al. |
| 2012/0127869 | A1 | 5/2012 | Yin et al. |
| 2012/0201207 | A1 | 8/2012 | Liu et al. |
| 2012/0220286 | A1* | 8/2012 | Chen et al. ............. 455/422.1 |
| 2012/0314613 | A1 | 12/2012 | Zhang et al. |
| 2013/0044653 | A1 | 2/2013 | Yang et al. |
| 2013/0114455 | A1* | 5/2013 | Yoo et al. .............. 370/252 |
| 2013/0114554 | A1 | 5/2013 | Yang et al. |
| 2013/0121299 | A1 | 5/2013 | Kim et al. |
| 2013/0128813 | A1 | 5/2013 | Yang et al. |
| 2013/0148613 | A1 | 6/2013 | Han et al. |
| 2013/0188591 | A1* | 7/2013 | Ko et al. ................ 370/329 |
| 2013/0215811 | A1 | 8/2013 | Takaoka et al. |
| 2013/0215841 | A1 | 8/2013 | Sun et al. |
| 2013/0230004 | A1 | 9/2013 | Nam et al. |
| 2013/0267222 | A1 | 10/2013 | Park et al. |
| 2013/0308607 | A1 | 11/2013 | Abe et al. |
| 2014/0029556 | A1 | 1/2014 | Hoshino et al. |

OTHER PUBLICATIONS

Nokia Siemens Networks, Nokia, "Periodic CSI Reporting for Carrier Aggregation," 3GPP TSG RAN WG1 Meeting #63, R1-106194, Nov. 2010.
Huawei, HiSilicon, "Periodic CQI/PMI/RI Reporting for CA," 3GPP TSG RAN WG1 Meeting #62bis, R1-105122, Oct. 2010.
3GPP TS 36.213 V8.6.0, "Evolved Universal Terrestrial Radio Access (E-UTRA) Physical layer procedures (Release 8)," Mar. 2009.
Ericsson, St-Ericsson, "Periodic CSI Reporting for CA," 3GPP TSG RAN WG1 Meeting #62bis, R1-105314, Oct. 2010.
Panasonic, "Periodic CQI Reporting for Carrier Aggregation," 3GPP TSG-RAN WG1 Meeting 60, R1-101258, Feb. 2010.
3GPP TS 36.213 V9.0.1, "Evolved Universal Terrestrial Radio Access (E-UTRA) Physical layer procedures (Release 9)," Dec. 2009.
Qualcomm Incorporated, "UCI Transmission for CS," 3GPP TSG RAN WG1 #62bis, R1-105563, Oct. 2010.
InterDigital Communications, LLC, "PUSCH Selection for Transmission of UCI," 3GPP TSG-RAN WG1 Meeting #62bis, R1-105277, Oct. 2010.
Media Tek Inc., "Remaining Issues of PUSCH Selection for UCI in Carrier Aggregation," 3GPP TSG-RAN WG1 #62bis, R1-105235, Oct. 2010.
HTC, "UCI on Simultaneous PUCCH/PUSCH Transmission," 3GPP TSG-RAN WG1 #62bis, R1-105516, Oct. 2010.
LG Electronics, "UCI Transmission for Simultaneous PUCCH/PUSCH," 3GPP TSG RAN WG1 Meeting #63, R1-106104, Nov. 2010.
International Search Report issued for International Patent Application No. PCT/JP2011/078836 on Jan. 17, 2012.
International Search Report issued for International Patent Application No. PCT/JP2011/076596 on Feb. 7, 2012.
Office Action issued for U.S. Appl. No. 12/962,515 on Aug. 29, 2013.
Advisory Action issued for U.S. Appl. No. 12/962,515 on Jun. 4, 2014.
Office Action issued for U.S. Appl. No. 12/962,515 on Mar. 27, 2014.
Office Action issued for U.S. Appl. No. 13/026,090 on Jul. 23, 2013.
Notice of Allowance issued for U.S. Appl. No. 13/026,090 on Nov. 4, 2013.
Office Action issued for U.S. Appl. No. 12/962,515 on Feb. 11, 2015.
Ko, Hyunsoo et al., "Efficient Reporting Method for Channel State Information Feedback", U.S. Appl. No. 61/410,355, filed Nov. 5, 2010.
Office Action issued for U.S. Appl. No. 12/962,515 on Jun. 4, 2015.

* cited by examiner

US 9,143,973 B2

PRIORITIZING MULTIPLE CHANNEL STATE INFORMATION (CSI) REPORTING WITH CARRIER AGGREGATION

RELATED APPLICATIONS

This application is a continuation of U.S. patent application Ser. No. 13/026,090 entitled "PRIORITIZING MULTIPLE CHANNEL STATE INFORMATION (CSI) REPORTING WITH CARRIER AGGREGATION," filed Feb. 11, 2011, which is a continuation-in-part of U.S. patent application Ser. No. 12/962,515 entitled "Prioritizing Multiple Channel State Information (CSI) Reporting with Carrier Aggregation," filed Dec. 7, 2010, which are both incorporated herein by reference.

TECHNICAL FIELD

The present invention relates generally to wireless communications and wireless communications-related technology. More specifically, the present invention relates to systems and methods for prioritizing multiple channel state information (CSI) reporting with carrier aggregation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve efficiency and quality of wireless communication. In Rel-10, multiple component carriers (CCs) or cells were introduced. The use of multiple component carriers (CCs) or cells may increase the amount of uplink control information (UCI) generated by a wireless communication device. Benefits may be realized by improved methods for reporting uplink control information (UCI) by a wireless communication device.

DETAILED DESCRIPTION

Figure 1:
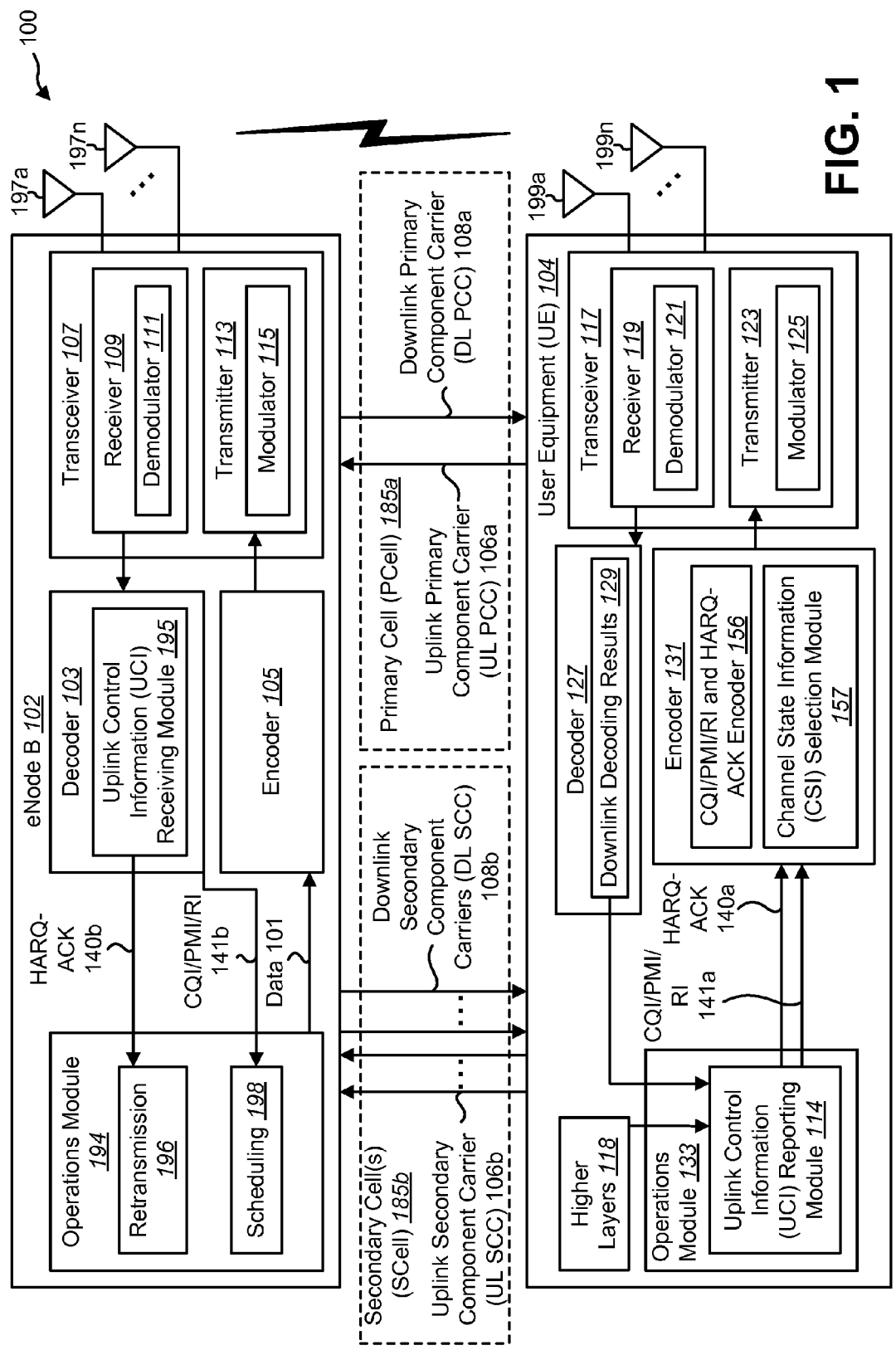
FIG. 1 is a block diagram illustrating a wireless communication system using uplink control information (UCI) multiplexing.

A method for reporting uplink control information (UCI) on a user equipment (UE) is described. Multiple channel state information (CSI) reports for multiple component carriers (CCs) are generated that are scheduled to be transmitted in a subframe. A method of prioritization for the CSI reports is selected. A highest priority CSI report of the multiple CSI reports is determined using the selected method of prioritization. The highest priority CSI report is transmitted.

The selected method of prioritization may include prioritizing the CSI reports based on a feedback reporting mode of each CSI report. Determining a highest priority CSI report may include determining a feedback reporting mode for each CSI report and prioritizing the multiple CSI reports according to the feedback reporting modes to determine the highest priority CSI report. Prioritizing the multiple CSI reports according to the feedback reporting modes may result in multiple CSI reports that are using a highest priority utilized feedback reporting mode. A predefined CC prioritization rule may be used to determine the highest priority CSI report of the multiple CSI reports that are using the highest priority utilized feedback reporting mode.

A feedback reporting type for each CSI report of the multiple CSI reports may be determined using the highest priority utilized feedback reporting mode. The multiple CSI reports that are using the highest priority utilized feedback reporting mode may be prioritized according to the feedback reporting types to determine the highest priority CSI report.

Prioritizing the multiple CSI reports that are using the highest priority utilized feedback reporting mode may result in multiple CSI reports that are using a highest priority utilized feedback reporting type. A predefined CC prioritization rule may be used to determine the highest priority CSI report of the multiple CSI reports that are using the highest priority utilized feedback reporting type.

The selected method of prioritization may include prioritizing the CSI reports based on a feedback reporting type of each CSI report. Determining a highest priority CSI report of the multiple CSI reports may include determining a feedback reporting type for each CSI report and prioritizing the multiple CSI reports according to the feedback reporting types to determine the highest priority CSI report.

A predefined CC prioritization rule may be used to determine the highest priority CSI report of the multiple CSI reports that are using the highest priority utilized feedback reporting type. A CSI report with a highest number of antenna ports of the multiple CSI reports that are using the highest priority utilized feedback reporting type may be determined. The CSI report with the highest number of antenna ports may be selected as the highest priority CSI report.

Prioritizing the multiple CSI reports according to the feedback reporting types may result in multiple CSI reports that are using a highest priority utilized feedback reporting type subset. The feedback reporting types in the highest priority utilized feedback reporting type subset may be prioritized to obtain the highest priority CSI report. A feedback reporting mode may be determined for each CSI report of the multiple CSI reports that are using the highest priority utilized feedback reporting type. The multiple CSI reports that are using the highest priority utilized feedback reporting type may be prioritized according to the feedback reporting modes to determine the highest priority CSI report.

Prioritizing the multiple CSI reports that are using the highest priority utilized feedback reporting type according to the feedback reporting modes may result in multiple CSI reports that are using a highest priority utilized feedback reporting mode. A predefined CC prioritization rule may be used to determine the highest priority CSI report of the multiple CSI reports that are using the highest priority utilized feedback reporting mode.

The selected method of prioritization may include prioritizing the CSI reports based on a priority number of each CSI report. Prioritizing the CSI reports based on a priority number may include defining a priority number for each reporting format according to at least one of feedback reporting type, feedback reporting mode, number of antenna ports and rank indication (RI). Prioritizing the CSI reports based on a priority number may also include determining a CSI report with a lowest priority number. Prioritizing the CSI reports based on a priority number may further include selecting the CSI report with the lowest priority number as the highest priority CSI report.

Determining a CSI report with a lowest priority number may result in multiple CSI reports that have the lowest priority number. Prioritizing the CSI reports based on a priority number may include using a predefined CC prioritization rule to determine the highest priority CSI report of the multiple CSI reports that have the lowest priority number. The highest priority CSI report may be transmitted to an eNode B via the physical uplink control channel (PUCCH).

A user equipment (UE) configured for reporting uplink control information (UCI) is described. The user equipment (UE) includes a processor, memory in electronic communication with the processor and instructions stored in the memory. The instructions are executable by the processor to generate multiple channel state information (CSI) reports for multiple component carriers (CCs) that are scheduled to be transmitted in a subframe. The instructions are also executable by the processor to select a method of prioritization for the CSI reports. The instructions are further executable by the processor to determine a highest priority CSI report of the multiple CSI reports using the selected method of prioritization. The instructions are also executable by the processor to transmit the highest priority CSI report collision of multiple channel state information (CSI) reports corresponding to multiple component carriers (CCs) that are scheduled to be reported in the same subframe.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8, Release-9 and Release-10). However, the scope of the present disclosure should not be limited in this regard. At least some aspects of the systems and methods disclosed herein may be utilized in other types of wireless communication systems.

The term "simultaneous" may be used herein to denote a situation where two or more events occur in overlapping time frames. In other words, two "simultaneous" events may overlap in time to some extent, but are not necessarily of the same duration. Furthermore, simultaneous events may or may not begin or end at the same time.

FIG. 1 is a block diagram illustrating a wireless communication system 100 using uplink control information (UCI) multiplexing. An eNode B 102 may be in wireless communication with one or more user equipments (UEs) 104. An eNode B 102 may be referred to as an access point, a Node B, a base station or some other terminology. Likewise, a user equipment (UE) 104 may be referred to as a mobile station, a subscriber station, an access terminal, a remote station, a user terminal, a terminal, a handset, a subscriber unit, a wireless communication device, or some other terminology.

Communication between a user equipment (UE) 104 and an eNode B 102 may be accomplished using transmissions over a wireless link, including an uplink and a downlink. The uplink refers to communications sent from a user equipment (UE) 104 to an eNode B 102. The downlink refers to communications sent from an eNode B 102 to a user equipment (UE) 104. The communication link may be established using a single-input and single-output (SISO), multiple-input and single-output (MISO), single-input and multiple-output (SIMO) or a multiple-input and multiple-output (MIMO) system. A MIMO system may include both a transmitter and a receiver equipped with multiple transmit and receive antennas. Thus, an eNode B 102 may have multiple antennas and a user equipment (UE) 104 may have multiple antennas. In this way, the eNode B 102 and the user equipment (UE) 104 may each operate as either a transmitter or a receiver in a MIMO system. One benefit of a MIMO system is improved performance if the additional dimensionalities created by the multiple transmit and receive antennas are utilized.

The user equipment (UE) 104 communicates with an eNode B 102 using one or more antennas 199a-n. The user equipment (UE) 104 may include a transceiver 117, a decoder 127, an encoder 131 and an operations module 133. The transceiver 117 may include a receiver 119 and a transmitter 123. The receiver 119 may receive signals from the eNode B 102 using one or more antennas 199a-n. For example, the receiver 119 may receive and demodulate received signals using a demodulator 121. The transmitter 123 may transmit signals to the eNode B 102 using one or more antennas 199a-n. For example, the transmitter 123 may modulate signals using a modulator 125 and transmit the modulated signals.

The receiver 119 may provide a demodulated signal to the decoder 127. The user equipment (UE) 104 may use the decoder 127 to decode signals and make downlink decoding results 129. The downlink decoding results 129 may indicate whether data was received correctly. For example, the downlink decoding results 129 may indicate whether a packet was correctly or erroneously received (i.e., positive acknowledgement, negative acknowledgement or discontinuous transmission (no signal)).

The operations module 133 may be a software and/or hardware module used to control user equipment (UE) 104 communications. For example, the operations module 133 may determine when the user equipment (UE) 104 requires resources to communicate with an eNode B 102.

In 3$^{rd}$ Generation Partnership Project (3GPP) Long Term Evolution (LTE)-Advanced, additional control feedback will have to be sent on control channels to accommodate MIMO and carrier aggregation. Carrier aggregation refers to transmitting data on multiple component carriers (CCs) (or cells) that are contiguously or separately located. Both the hybrid automatic repeat and request (ARQ) acknowledgement (HARQ-ACK) with positive-acknowledge and negative-acknowledge (ACK/NACK) bits and other control information may be transmitted using the physical uplink control channel (PUCCH). In carrier aggregation (CA), only one uplink component carrier (CC) (or cell) may be utilized for transmission of control information. In LTE-A, component carriers (CCs) are referred to as cells.

The user equipment (UE) 104 may transmit uplink control information (UCI) to an eNode B 102 on the uplink. The uplink control information (UCI) may include a channel quality indicator (CQI), a precoding matrix indicator (PMI), rank indication (RI), a scheduling request (SR) and a hybrid automatic repeat request acknowledgement (HARQ-ACK) 140a. HARQ-ACK 140a means ACK (positive-acknowledgement) and/or NACK (negative-acknowledgement) and/or DTX (discontinuous transmission) responses for HARQ operation, also known as ACK/NACK. If a transmission is successful, the HARQ-ACK 140a may have a logical value of 1 and if the transmission is unsuccessful, the HARQ-ACK 140a may have a logical value of 0.

The channel quality indicator (CQI) may indicate a combination of modulation scheme and coding rate. The precoding matrix indicator (PMI) indicates the codebook for precoding the MIMO transmission. The rank indication (RI) indicates the number of useful transmission layers for the MIMO transmission. There are different types of channel quality indicator (CQI) feedback. For periodic reporting, there is wideband feedback (WB-CQI) and UE-selected subband feedback (UE-CQI). In wideband feedback (WB-CQI), the UE may report one wideband channel quality indicator (CQI) value for the whole system bandwidth. In UE-selected subband feedback (UE-CQI), the UE may report the channel quality indicator (CQI) for some subbands instead of the whole system bandwidth. The system bandwidth may be divided into J bandwidth parts, as illustrated in Table 1.

TABLE 1

| System Bandwidth $N_{RB}^{DL}$ | Subband Size k (RBs) | Bandwidth Parts (J) |
| --- | --- | --- |
| 6-7 | NA | NA |
| 8-10 | 4 | 1 |
| 11-26 | 4 | 2 |
| 27-63 | 6 | 3 |
| 64-110 | 8 | 4 |

In one configuration, the CQI/PMI/RI 141a and the HARQ-ACK 140a may be separately coded. In another configuration, the CQI/PMI/RI 141a and the HARQ-ACK 140a may be jointly coded. Herein, CQI/PMI/RI 141 refers to CQI and/or PMI and/or RI. CQI/PMI/RI 141 may also be referred to as channel state information (CSI). The CQI and/or PMI and/or RI may be reported together or independently based on the physical uplink control channel (PUCCH) reporting modes. ACK/NACK refers to ACK and/or NACK. CQI/PMI/RI 141 and HARQ-ACK 140 refers to ((CQI and/or PMI and/or RI) AND HARQ-ACK 140). CQI/PMI/RI 141 or HARQ-ACK 140 refers to ((CQI and/or PMI and/or RI) OR HARQ-ACK 140). The CQI/PMI/RI 141 may be collectively referred to as channel state information (CSI). A channel state information (CSI) report thus may include a CQI/PMI/RI 141 report. Channel state information (CSI) is discussed in additional detail below in relation to FIG. 2.

Channel state information (CSI) reporting from a user equipment (UE) 104 to an eNode B 102 may be periodic or aperiodic. Aperiodic channel state information (CSI) reports may be requested by an eNode B 102. Aperiodic channel state information (CSI) reports are not transmitted on the physical uplink control channel (PUCCH). Periodic channel state information (CSI) reports may be configured by an eNode B 102, so that a user equipment (UE) 104 reports channel state information (CSI) to the eNode B 102 at pre-specified subframes. When periodic channel state information (CSI) reports are scheduled for transmission, if only the physical uplink control channel (PUCCH) is available, one periodic channel state information (CSI) report corresponding to one component carrier (CC) 108 may be transmitted on the physical uplink control channel (PUCCH). In Rel-8/9, simultaneous physical uplink shared channel (PUSCH) and physical uplink control channel (PUCCH) transmission is not allowed. Thus, if a physical uplink shared channel (PUSCH) is scheduled, one periodic channel state information (CSI) report may be multiplexed on the physical uplink shared channel (PUSCH). Aperiodic channel state information (CSI) reports are always transmitted on the physical uplink shared channel (PUSCH). Hence, there is a need for a distinction between periodic channel state information (CSI) reports and aperiodic channel state information (CSI) reports.

The CQI/PMI/RI 141a report and the HARQ-ACK 140a may be generated by the uplink control information (UCI) reporting module 114 and transferred to a CQI/PMI/RI and HARQ-ACK encoder 156 that is part of the encoder 131. The CQI/PMI/RI and HARQ-ACK encoder 156 may generate uplink control information (UCI) using backwards-compatible physical uplink control channel (PUCCH) formats and physical uplink shared channel (PUSCH) formats. Backwards-compatible physical uplink control channel (PUCCH) formats are those formats that may be used by Release-10 user equipments (UEs) 104 as well as Release-8/9 user equipments (UEs) 104.

The CQI/PMI/RI and HARQ-ACK encoder 156 may include a channel state information (CSI) selection module 157. In Release-8, a user equipment (UE) 104 does not simultaneously transmit on the physical uplink control channel (PUCCH) and the physical uplink shared channel (PUSCH). Aperiodic channel state information (CSI) reports are always transmitted on the physical uplink shared channel (PUSCH). Only one channel state information (CSI) report may be transmitted on the physical uplink control channel (PUCCH). Thus, the channel state information (CSI) selection module 157 may be used to determine which channel state information (CSI) report should be transmitted on the physical uplink control channel (PUCCH).

One resource of the physical uplink control channel (PUCCH) may be allocated for transmission of the uplink control information (UCI) with collision resolution procedures resolving any collision issues. In general, the resource allocated for the transmission of HARQ-ACK 140a is different from the resource allocated for the transmission of periodic channel state information (CSI) on the physical uplink control channel (PUCCH). If only one of the HARQ-ACK 140a and the periodic channel state information (CSI) is available for transmission, the corresponding resource is used for transmissions. In case of a collision in the schedule of the transmission of HARQ-ACK 140a and channel state information (CSI), a collision resolution procedure may be used to determine the resource and format used for transmission. If the physical uplink shared channel (PUSCH) is available, the aperiodic channel state information (CSI) reports may take priority over periodic channel state information (CSI) reports and be time and/or frequency shared with the HARQ-ACK 140.

In 3GPP LTE Release-10 (LTE-A or Advanced EUTRAN), simultaneous physical uplink shared channel (PUSCH) and physical uplink control channel (PUCCH) transmission is introduced and can be configured. A user equipment (UE) 104 may have several transmission modes including physical uplink control channel (PUCCH) only transmission (when no physical uplink shared channel (PUSCH) is scheduled), physical uplink shared channel (PUSCH) only transmission (when simultaneous physical uplink shared channel (PUSCH) and physical uplink control channel (PUCCH) transmission is not configured and a physical uplink shared channel (PUSCH) is scheduled) and simultaneous physical uplink shared channel (PUSCH) and physical uplink control channel (PUCCH) transmission when it is configured. If simultaneous physical uplink shared channel (PUSCH) and physical uplink control channel (PUCCH) transmission is configured, the physical uplink control channel (PUCCH) is assumed to always be available to send uplink control information (UCI). The physical uplink control channel (PUCCH) for CQI/PMI/RI 141a may be semi-statically scheduled by an eNode B 102, but the physical uplink control channel (PUCCH) for ACK/NACK may be dynamically allocated based on downlink configurations and transmission.

When multiple channel state information (CSI) reports from more than one component carrier (CC) 108 or cell 185 are scheduled to be reported in the same subframe or when different types of channel state information (CSI) from the same component carrier (CC) are scheduled to be reported in the same subframe, this may be referred to as a collision. A user equipment (UE) 104 that has multiple uplink control information (UCI) elements for transmission may experience a collision. Some collision resolution procedures have already been defined for Rel-8. However, additional collision resolution procedures for Rel-10 may be needed. Due to the low payload size of the physical uplink control channel (PUCCH), some of the channel state information (CSI) reports may be dropped during a collision. The methods herein describe how to select which channel state information (CSI) reports from different component carriers (CCs) 108 (or cells 185) to drop.

The use of simultaneous physical uplink shared channel (PUSCH) and physical uplink control channel (PUCCH) transmissions may be configured by a radio resource control (RRC) configuration based on user equipment (UE) 104 specific radio resource control (RRC) signaling. When a user equipment (UE) 104 that is configured for simultaneous physical uplink shared channel (PUSCH) and physical uplink control channel (PUCCH) transmission is allocated or assigned both the physical uplink shared channel (PUSCH) and the physical uplink control channel (PUCCH) on a subframe the user equipment (UE) 104 may transmit on the physical uplink shared channel (PUSCH) and the physical uplink control channel (PUCCH) simultaneously. When the user equipment (UE) 104 is required to transmit on both the physical uplink shared channel (PUSCH) and the physical uplink control channel (PUCCH) on a subframe, the user equipment (UE) 104 may transmit on the physical uplink shared channel (PUSCH) and the physical uplink control channel (PUCCH) simultaneously.

The user equipment (UE) 104 may also transmit a reference signal (RS) to an eNode B 102. The uplink control information (UCI) may be transmitted using the physical uplink control channel (PUCCH) and/or the physical uplink shared channel (PUSCH). One or more physical uplink control channel (PUCCH) reference signal (RS) symbols are included in a physical uplink control channel (PUCCH) signal transmission on each slot.

The time and frequency resources may be quantized to create a grid known as the time-frequency grid. In the time domain, 10 milliseconds (ms) is referred to as one radio frame. One radio frame may include 10 subframes, each with a duration of 1 ms, which is the duration of transmission in the uplink and/or downlink. Every subframe may be divided into two slots, each with a duration of 0.5 ms. Each slot may be divided into 7 symbols. The frequency domain may be divided into bands with a 15 kilohertz (kHz) width, referred to as a subcarrier. One resource element has a duration of one symbol in the time domain and the bandwidth of one subcarrier in the frequency domain.

The minimum amount of resource that can be allocated for the transmission of information in the uplink or downlink in any given subframe is two resource blocks (RBs), with one RB at each slot. One RB has a duration of 0.5 ms (7 symbols or one slot) in the time domain and a bandwidth of 12 subcarriers (180 kHz) in the frequency domain. At any given subframe, a maximum of two RBs (one RB at each slot) can be used by a given user equipment (UE) 104 for the transmission of uplink control information (UCI) in the physical uplink control channel (PUCCH). However, the eNode B 102 may allocate different RBs for the transmission of HARQ-ACK 140a and periodic channel state information (CSI). In case of a collision, a collision resolution mechanism may decide which RB and what format are used for the transmission of both or one of the HARQ-ACK 140a and the periodic channel state information (CSI).

In LTE Release-8, only one uplink component carrier (CC) 106 or cell 185 and one downlink component carrier (CC) 108 or cell 185 can be used for transmission to and reception from each user equipment (UE) 104. The uplink control information (UCI) such as ACK/NACK bits for hybrid ARQ (HARQ) 140a and periodic channel quality indicators (CQI), periodic precoding matrix indicator (PMI) and periodic rank indication (RI) can be sent on the physical uplink control channel (PUCCH), on the physical uplink shared channel (PUSCH) or on both. In one configuration where simultaneous physical uplink shared channel (PUSCH) and physical uplink control channel (PUCCH) transmission is configured, there may be a first uplink control information (UCI) that is scheduled on the physical uplink control channel (PUCCH) and a second uplink control information (UCI) that is scheduled on the physical uplink shared channel (PUSCH). In some conditions, for example in cases when simultaneous physical uplink shared channel (PUSCH) and physical uplink control channel (PUCCH) transmission is not configured, the uplink control information (UCI) that is scheduled on the physical uplink control channel (PUCCH) may be transmitted on the physical uplink shared channel (PUSCH) if a physical uplink shared channel (PUSCH) is scheduled in the subframe.

The physical uplink control channel (PUCCH) may occupy one resource block (RB) at each slot. Thus, a very limited amount of information can be transmitted on the physical uplink control channel (PUCCH).

In 3GPP Long Term Evolution (LTE) Release-10 (LTE-A or Advanced EUTRAN), carrier aggregation was introduced. Carrier aggregation may also be referred to as cell aggregation. Carrier aggregation is supported in both the uplink and the downlink with up to five component carriers (CCs) 106, 108, also known as cells 185. Each component carrier (CC) 106, 108 or cell 185 may have a transmission bandwidth of up to 110 resource blocks (i.e., up to 20 megahertz (MHz)). In carrier aggregation, two or more component carriers (CCs) 106, 108 or cells 185 are aggregated to support wider transmission bandwidths up to one hundred megahertz (MHz). A user equipment (UE) 104 may simultaneously receive and/or transmit on one or multiple component carriers (CCs) 106, 108 or cells 185, depending on the capabilities of the user equipment (UE) 104.

Based on current agreements, cyclic reporting of periodic CQI/PMI/RI 141 of each component carrier (CC) 108 or cell is supported in Release-10. Thus, the same periodic CQI/PMI/RI 141 payload as in Release-8 can be used. Therefore, a Format 2 or Format 3 based physical uplink control channel (PUCCH) may be reused for periodic CQI/PMI/RI 141 reporting of each component carrier (CC) 108 or cell 185.

A user equipment (UE) 104 may communicate with an eNode B 102 using multiple component carriers (CCs) 108 or cells 185 at the same time. For example, a user equipment (UE) 104 may communicate with an eNode B 102 using a primary cell (PCell) 185a while simultaneously communicating with the eNode B 102 using secondary cell(s) (SCell) 185b. Similarly, an eNode B 102 may communicate with a user equipment (UE) 104 using multiple component carriers (CCs) 108 or cells 185 at the same time. For example, an eNode B 102 may communicate with a user equipment (UE) 104 using a primary cell (PCell) 185a while simultaneously communicating with the user equipment (UE) 104 using secondary cell(s) (SCell) 185b.

An eNode B 102 may include a transceiver 107 that includes a receiver 109 and a transmitter 113. An eNode B 102 may additionally include a decoder 103, an encoder 105 and an operations module 194. An eNode B 102 may receive uplink control information (UCI) using its one or more antennas 197a-n and its receiver 109. The receiver 109 may use the demodulator 111 to demodulate the uplink control information (UCI).

The decoder 103 may include an uplink control information (UCI) receiving module 195. An eNode B 102 may use the uplink control information (UCI) receiving module 195 to decode and interpret the uplink control information (UCI) received by the eNode B 102. The eNode B 102 may use the decoded uplink control information (UCI) to perform certain operations, such as retransmit one or more packets based on scheduled communication resources for the user equipment (UE) 104. The uplink control information (UCI) may include a CQI/PMI/RI 141b and/or an HARQ-ACK 140b.

The operations module 194 may include a retransmission module 196 and a scheduling module 198. The retransmission module 196 may determine which packets to retransmit (if any) based on the uplink control information (UCI). The scheduling module 198 may be used by the eNode B 102 to schedule communication resources (e.g., bandwidth, time slots, frequency channels, spatial channels, etc.). The scheduling module 198 may use the uplink control information (UCI) to determine whether (and when) to schedule communication resources for the user equipment (UE) 104.

The operations module 194 may provide data 101 to the encoder 105. For example, the data 101 may include packets for retransmission and/or a scheduling grant for the user equipment (UE) 104. The encoder 105 may encode the data 101, which may then be provided to the transmitter 113. The transmitter 113 may modulate the encoded data using the modulator 115. The transmitter 113 may transmit the modulated data to the user equipment (UE) 104 using one or more antennas 197a-n.

When carrier aggregation is configured, a user equipment (UE) 104 may have only one radio resource control (RRC) connection with the network. At the radio resource control (RRC) connection establishment/re-establishment/handover, one serving cell 185 (i.e., the primary cell (PCell) 185a) provides the non-access stratum (NAS) mobility information (e.g., Tracking Area Identity (TAI)) and the security input.

In the downlink, the component carrier (CC) 108 corresponding to the primary cell (PCell) 185a is the downlink primary component carrier (DL PCC) 108a. In the uplink, the component carrier (CC) 106 corresponding to the primary cell (PCell) 185a is the uplink primary component carrier (UL PCC) 106a. Depending on the capabilities of the user equipment (UE) 104, one or more secondary component carriers (SCC) 106b, 108b or secondary cells (SCell) 185b may be configured to form a set of serving cells with the primary cell (PCell) 185a. In the downlink, the component carrier (CC) 108 corresponding to the secondary cell (SCell) 185b is the downlink secondary component carrier (DL SCC) 108b. In the uplink, the component carrier (CC) 106 corresponding to the secondary cell (SCell) 185b is the uplink secondary component carrier (UL SCC) 106b. The number of downlink component carriers (CCs) 108 or cells 185 may be different from the number of uplink component carriers (CCs) 106 or cells 185 because multiple user equipments (UEs) 104 may share one uplink component carrier (CC) 106.

In LTE-A, the component carriers (CCs) 106, 108 are referred to as cells 185. If carrier aggregation is configured, a user equipment (UE) 104 may have multiple serving cells: a primary cell (PCell) 185a and one or more secondary cells (SCell) 185b. From a network perspective, the same serving cell 185 may be used as the primary cell (PCell) 185a by one user equipment (UE) 104 and used as a secondary cell (SCell) 185b by another user equipment (UE) 104. A primary cell (PCell) 185a that is operating according to Release-8/9 is equivalent to the Release-8/9 serving cell. When operating according to Release-10, there may be one or more secondary cells (SCell) 185b in addition to the primary cell (PCell) 185a if carrier aggregation is configured.

A number of spatial channels may be available on each serving cell 185 by using multiple antennas at a transmitter and a receiver. Therefore, multiple codewords (up to two codewords) may be transmitted simultaneously. If the user equipment (UE) 104 is configured with five component carriers (CCs) 106, 108 or cells 185 and two codewords for each of the component carriers (CCs) 106, 108 or cells 185, ten HARQ-ACK 140 acknowledgement/negative acknowledgement (ACK/NACK) bits for a single downlink subframe may be generated by the user equipment (UE) 104. One benefit of using carrier aggregation is that additional downlink and/or uplink data may be transmitted. As a result of the additional downlink data, additional uplink control information (UCI) may be needed.

It has been agreed that for periodic CQI/PMI/RI 141 reporting for carrier aggregation, the configuration of different (in time) physical uplink control channel (PUCCH) resources for reports for each component carrier (CC) 106, 108 or cell 185 is supported.

A channel state information (CSI) report may be generated for each component carrier (CC) 106, 108 or cell 185. In Rel-10, it has been agreed that periodic channel state information (CSI) reporting for up to five downlink component carriers (CCs) 108 (or cells 185) on the physical uplink control channel (PUCCH) on a single user equipment (UE)-specific uplink component carrier (CC) 106 (or cell 185) should be supported. A channel state information (CSI) report may be used to inform the eNode B 102 to adjust the transmission rate (modulation scheme and coding rate) dynamically based on the existing channel conditions at the user equipment (UE) 104. For example, if a channel state information (CSI) report indicates a good channel quality at the user equipment (UE) 104, the eNode B 102 may select a higher order modulation and coding rate, thereby achieving a higher transmission rate for the downlink transmission of data on the physical downlink shared channel (PDSCH). If a channel state information (CSI) report indicates a poor channel quality at the user equipment (UE) 104, the eNode B 102 may select a lower order modulation and coding rate, thereby achieving higher reliability for the transmission.

A channel state information (CSI) report may be referred to as a rank indication (RI) report if the channel state information (CSI) report only includes rank indication (RI). A channel state information (CSI) report may be referred to as a channel quality indicator (CQI) report if the channel state information (CSI) report only includes a channel quality indicator (CQI). A channel state information (CSI) report may be referred to as a precoding matrix indicator (PMI) report if the channel state information (CSI) report only includes a precoding matrix indicator (PMI).

Figure 2:
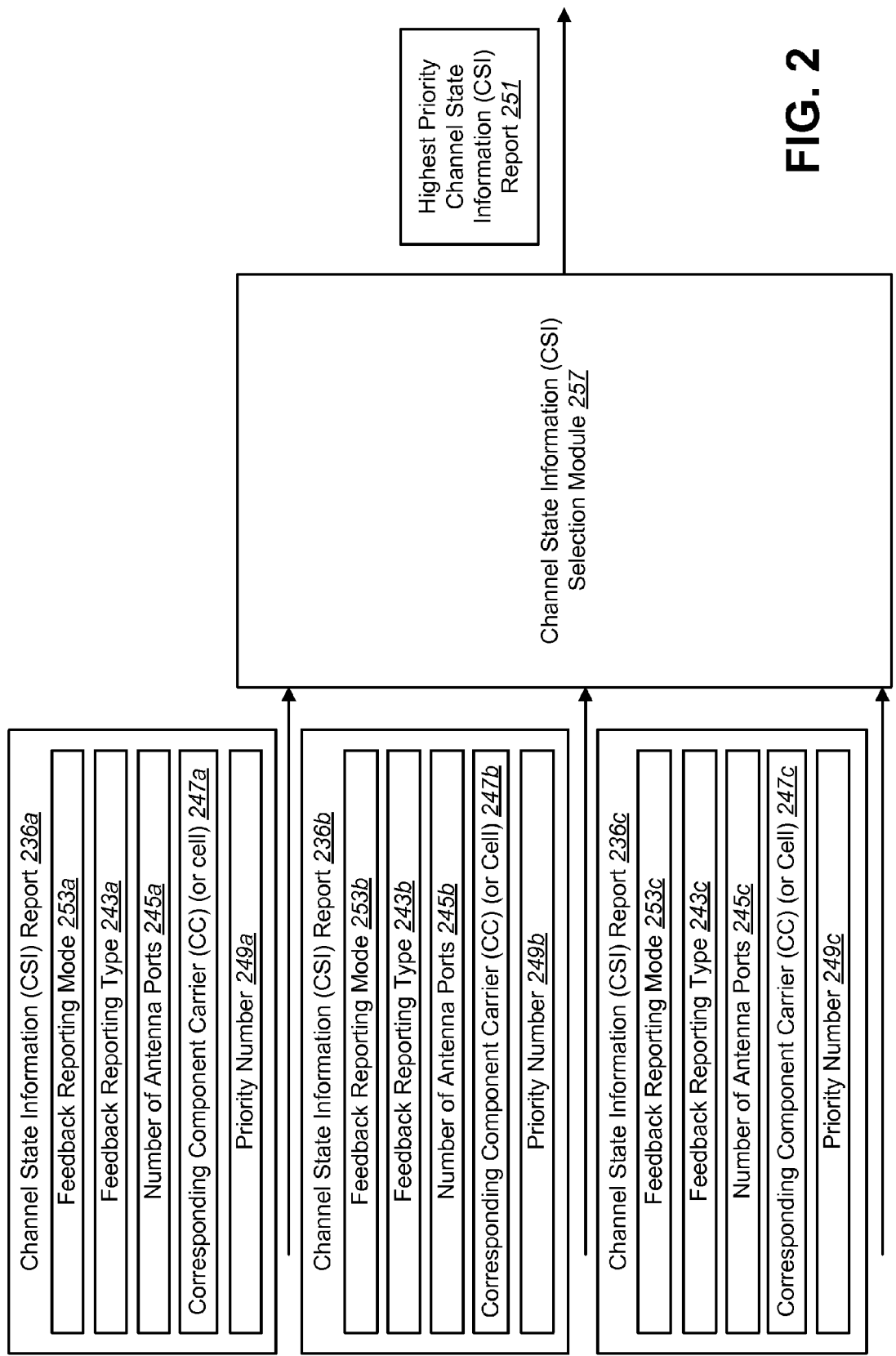
FIG. 2 is a block diagram illustrating a channel state information (CSI) selection module for use in the present systems and methods.

FIG. 2 is a block diagram illustrating a channel state information (CSI) selection module 257 for use in the present systems and methods. The channel state information (CSI) selection module 257 of FIG. 2 may be one configuration of the channel state information (CSI) selection module 157 of FIG. 1. The channel state information (CSI) selection module 257 may receive multiple channel state information (CSI) reports 236a-c. Each channel state information (CSI) report 236 may be scheduled to be transmitted to an eNode B 102 during a subframe. Thus, each of the channel state information (CSI) reports 236 may collide.

Each channel state information (CSI) report 236 may include a feedback reporting mode 253a-c. A user equipment (UE) 104 may be semi-statically configured by higher layers 118 to periodically feedback different channel quality indicator (CQI), precoding matrix indicator (PMI) and rank indication (RI) on the physical uplink control channel (PUCCH) using the feedback reporting modes 253 given in Table 2.

TABLE 2

| | PMI Feedback Type | | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Different transmission modes may use different feedback reporting modes 253. For instance, transmission mode 1 may use mode 1-0 and mode 2-0. Transmission mode 1 may be used for a single eNode B 102 antenna port transmission. Transmission mode 2 may use mode 1-0 and mode 2-0. Transmission mode 2 may be used for transmit diversity. Transmission mode 3 may use mode 1-0 and mode 2-0. Transmission mode 3 may be used for open-loop spatial multiplexing. Transmission mode 4 may use mode 1-1 and mode 2-1. Transmission mode 4 may be used for closed-loop spatial multiplexing. Transmission mode 5 may use mode 1-1 and mode 2-1. Transmission mode 5 may be used for multi-user MIMO. Transmission Mode 6 may use mode 1-1 and mode 2-1. Transmission mode 6 may be used for closed loop rank-1 precoding.

Transmission mode 7 may use mode 1-0 and Mode 2-0. Transmission Mode 7 may be used for a transmission using UE-specific reference signals. Transmission mode 8 may use mode 1-1 and mode 2-1 if the user equipment (UE) 104 is configured with PMI/RI reporting. Transmission mode 8 may instead use mode 1-0 and mode 2-0 if the user equipment (UE) 104 is configured without PMI/RI reporting (single antenna port, transmit diversity or dual layer MIMO transmission). Transmission mode 9 may use mode 1-0 and mode 2-1 if the user equipment (UE) 104 is configured with PMI/RI reporting. Transmission mode 9 may use mode 1-0 and mode 2-0 if the user equipment (UE) 104 is configured without PMI/RI reporting (single antenna port, transmit diversity or dual layer MIMO transmission).

The feedback reporting mode 253 used for a periodic channel state information (CSI) report 236 may be given by the parameter cqi-FormatIndicatorPeriodic, which is configured by higher layer 118 signaling. Mode 1-1 may be configured to be either sub-mode 1 or sub-mode 2 via higher layer 118 signaling using the parameter PUCCH_format1-1_CSI_reporting_mode.

Each channel state information (CSI) report 236 may also include a feedback reporting type 243a-c. A feedback reporting type 243 may be referred to as a physical uplink control channel (PUCCH) report type for physical uplink control channel (PUCCH) transmissions. For each feedback reporting mode 253, there are different feedback reporting types 243. For the physical uplink control channel (PUCCH) feedback reporting modes 253 in Table 2 above, the feedback reporting types 243 of Table 3 with distinct periods and offsets are supported.

TABLE 3

| PUCCH | | | PUCCH Reporting Modes | | | |
|---|---|---|---|---|---|---|
| Report Type | Reported | Mode State | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |
| 2 | Wideband CQI/PMI | 2 antenna ports RI = 1 | 6 | 6 | NA | NA |
| | | 4 antenna ports RI = 1 | 8 | 8 | NA | NA |

TABLE 3-continued

| PUCCH Report Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI/second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI/first PMI/second PMI | 8 antenna ports RI = 1 | 8 | — | NA | NA |
| | | 8 antenna ports 1 < RI ≤ 4 | 11 | — | NA | NA |
| | | 8 antenna ports 4 < RI ≤ 4 | 9 | — | NA | NA |
| | | 8 antenna ports RI = 8 | 7 | — | NA | NA |
| 3 | RI | 2-layer spatial multiplexing | 1 | 1 | 1 | 1 |
| | | 4-layer spatial multiplexing | 2 | 2 | 2 | 2 |
| | | 8-layer spatial multiplexing | 3 | 3 | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

A feedback reporting type {1} 243 report may support channel quality indicator (CQI) feedback for UE-selected subbands. A feedback reporting type {1a} 243 report may support subband channel quality indicator (CQI) and the second precoding matrix indicator (PMI) feedback. Feedback reporting type {2} 243 reports, feedback reporting type {2b} 243 reports and feedback reporting type {2c} 243 reports may support wideband channel quality indicator (CQI) and precoding matrix indicator (PMI) feedback. A feedback reporting type {2a} 243 report may support wideband precoding matrix indicator (PMI) feedback. A feedback reporting type {3} 243 report may support rank indication (RI) feedback. A feedback reporting type {4} 243 report may support wideband channel quality indicator (CQI) feedback. A feedback reporting type {5} 243 report may support rank indication (RI) and wideband precoding matrix indicator (PMI) feedback. A feedback reporting type {6} 243 report may support rank indication (RI) and precoder type indication (PTI) feedback.

A channel state information (CSI) report 236 may also include the number of antenna ports 245a-c. For example, a channel state information (CSI) report 236 may correspond to eight antenna ports, four antenna ports or two antenna ports. A channel state information (CSI) report 236 may further include the corresponding component carrier (CC) 108 (or cell 185) 247a-c of the channel state information (CSI) report 236. This may allow the channel state information (CSI) selection module 257 to prioritize channel state information (CSI) reports 236 using radio resource control (RRC) based prioritization that is signaled by higher layers 118. Radio resource control (RRC) based prioritization refers to a predefined component carrier (CC) 108 prioritization rule that specifies the priority ordering of component carriers (CCs) 108 (e.g., CC1>CC2>CC3).

A channel state information (CSI) report 236 may further include a priority number 249a-c. For each reporting format, a priority number 249 may be defined. In increasing order, the priority goes lower (i.e., a lower priority number 249 has a higher priority). The priority numbers 249 may be defined according to the feedback reporting mode 253, the feedback reporting type 243, the number of antenna ports 245 and the rank indication (RI). One example of a table of priority numbers 249 is given in Table 4.

TABLE 4

| PUCCH Report Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 1 | Sub-band CQI | RI = 1 | NA | 9 | NA | 11 |
| | | RI > 1 | NA | 8 | NA | 10 |

TABLE 4-continued

| PUCCH Report Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 1a | Sub-band CQI/second PMI | 8 antenna ports RI = 1 | NA | 9 | NA | NA |
| | | 8 antenna ports 1 < RI < 5 | NA | 8 | NA | NA |
| | | 8 antenna ports RI > 4 | NA | 7 | NA | NA |
| 2 | Wideband CQI/PMI | 2 antenna ports RI = 1 | 6 | 6 | NA | NA |
| | | 4 antenna ports RI = 1 | 6 | 6 | NA | NA |
| | | 2 antenna ports RI > 1 | 5 | 5 | NA | NA |
| | | 4 antenna ports RI > 1 | 5 | 5 | NA | NA |
| 2a | Wideband first PMI | 8 antenna ports RI < 3 | NA | 5 | NA | NA |
| | | 8 antenna ports 2 < RI < 8 | NA | 5 | NA | NA |
| | | 8 antenna ports RI = 8 | NA | 3 | NA | NA |
| 2b | Wideband CQI/second PMI | 8 antenna ports RI = 1 | 6 | 6 | NA | NA |
| | | 8 antenna ports 1 < RI < 4 | 5 | 5 | NA | NA |
| | | 8 antenna ports RI = 4 | 4 | 4 | NA | NA |
| | | 8 antenna ports RI > 4 | 3 | 3 | NA | NA |
| 2c | Wideband CQI/first PMI/second PMI | 8 antenna ports RI = 1 | 6 | — | NA | NA |
| | | 8 antenna ports 1 < RI ≤ 4 | 5 | — | NA | NA |
| | | 8 antenna ports 4 < RI ≤ 4 | 4 | — | NA | NA |
| | | 8 antenna ports RI = 8 | 3 | — | NA | NA |
| 3 | RI | 2-layer spatial multiplexing | 1 | 1 | 2 | 2 |
| | | 4-layer spatial multiplexing | 1 | 1 | 2 | 2 |
| | | 8-layer spatial multiplexing | 1 | 1 | NA | NA |
| 4 | Wideband CQI | RI = 1 or RI > 1 | NA | NA | 6 | 6 |
| 5 | RI/first PMI | 8 antenna ports, 2-layer spatial multiplexing | 1 | NA | NA | NA |
| | | 8 antenna ports, 4 and 8-layer spatial multiplexing | 1 | | | |
| 6 | RI/PTI | 8 antenna ports, 2-layer spatial multiplexing | NA | 1 | NA | NA |
| | | 8 antenna ports, 4-layer spatial multiplexing | NA | 1 | NA | NA |
| | | 8 antenna ports, 8-layer spatial multiplexing | NA | 1 | NA | NA |

The channel state information (CSI) selection module 257 may receive multiple channel state information (CSI) reports 236. The channel state information (CSI) selection module 257 may then determine a highest priority channel state information (CSI) report 251 from among the multiple channel state information (CSI) reports 236. The channel state information (CSI) selection module 257 may use one or more of the feedback reporting mode 253, the feedback reporting type 243, the number of antenna ports 245, the corresponding component carrier (CC) 108 (or cell 185) 247 of the channel state information (CSI) report 236 and the priority number 249 to determine the highest priority channel state information (CSI) report 251. For example, the channel state information (CSI) selection module 257 may prioritize the channel state information (CSI) reports 236 based on the feedback reporting mode 253 followed by the feedback reporting type 243. The channel state information (CSI) reports 236 received by the channel state information (CSI) selection module 257 that are not selected as the highest priority channel state information (CSI) report 251 may then be dropped by the channel state information (CSI) selection module 257.

Figure 3:
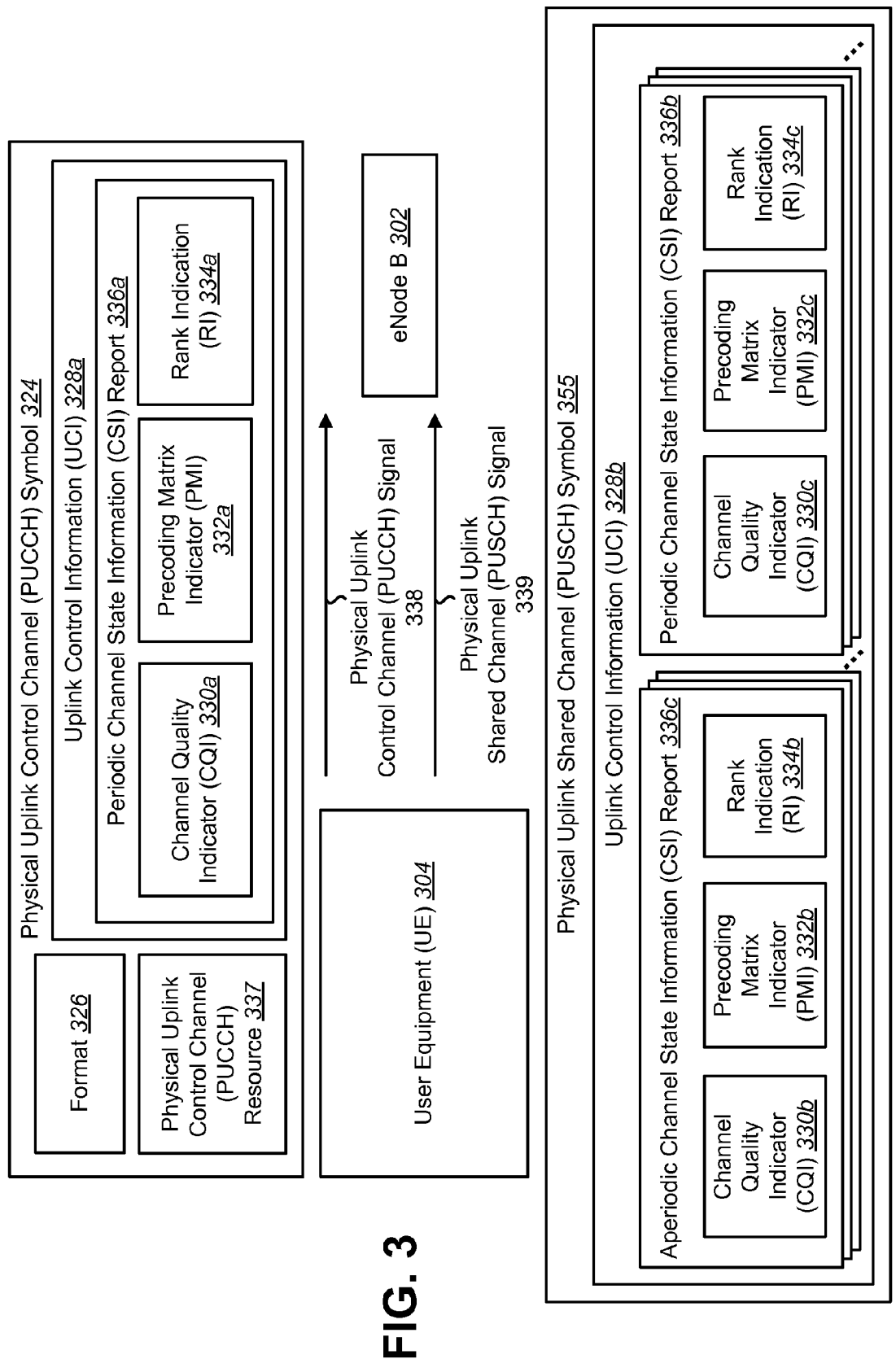
FIG. 3 is a block diagram illustrating transmissions from a user equipment (UE) to an eNode B during a subframe.

FIG. 3 is a block diagram illustrating transmissions from a user equipment (UE) 304 to an eNode B 302 during a subframe. The user equipment (UE) 304 may transmit a physical uplink control channel (PUCCH) symbol 324 via a physical uplink control channel (PUCCH) signal 338 to the eNode B 302. The user equipment (UE) 304 may also transmit a physical uplink shared channel (PUSCH) symbol 355 via a physical uplink shared channel (PUSCH) signal 339 to the eNode B 302. In one configuration, the user equipment (UE) 304 may simultaneously transmit a physical uplink control channel (PUCCH) symbol 324 and a physical uplink shared channel (PUSCH) symbol 355 to the eNode B 302.

Simultaneous transmission on the physical uplink control channel (PUCCH) and the physical uplink shared channel (PUSCH) is introduced and configurable in Release-10. In Release-8 and Release-9, simultaneous transmission on the physical uplink control channel (PUCCH) and the physical uplink shared channel (PUSCH) is not allowed. Thus, all references to simultaneous transmission on the physical uplink control channel (PUCCH) and the physical uplink shared channel (PUSCH) are related to Release-10, and not to Release-8 or Release-9.

The physical uplink control channel (PUCCH) symbol 324 may include uplink control information (UCI) 328*a*. The uplink control information (UCI) 328*a* may include a highest priority periodic channel state information (CSI) report 336*a*. A channel state information (CSI) report 336 refers to the channel state information (CSI) of each of the downlink component carriers (CCs) 108. Because the physical uplink control channel (PUCCH) can only include one channel state information (CSI) report, the physical uplink control channel (PUCCH) symbol may only include the highest priority channel state information (CSI) report. The highest priority periodic channel state information (CSI) report 336a may include a channel quality indicator (CQI) 330a, a precoding matrix indicator (PMI) 332a and/or a rank indication (RI) 334a. A channel quality indicator (CQI) 330 indicates the modulation and coding rate. A precoding matrix indicator (PMI) 332 indicates the codebook for precoding using multiple-input and multiple-output (MIMO). The rank indication (RI) 334 is the number of useful transmission layers for a multiple-input and multiple-output (MIMO) transmission.

The CQI, PMI and RI may be reported in a periodic channel state information (CSI) report 336a-b or an aperiodic channel state information (CSI) report 336c. The highest priority periodic channel quality indicator (CQI) report 336a from a frequency selective scheduling mode may be transmitted on the physical uplink control channel (PUCCH). Aperiodic channel state information (CSI) reports 336c from a frequency selective scheduling mode may be transmitted on the physical uplink shared channel (PUSCH). Periodic channel state information (CSI) reports 336a from a frequency non-selective scheduling mode may be transmitted on the physical uplink control channel (PUCCH). In Rel-8, when both periodic and aperiodic reporting would occur in the same subframe, the user equipment (UE) 304 would only transmit the aperiodic channel state information (CSI) report 336c in that subframe. In other words, for a frequency non-selective scheduling mode, only periodic channel quality indicator (CQI) feedback is needed. For frequency selective scheduling, both periodic and aperiodic feedback information is needed.

In Rel-8/9, only one component carrier (CC) 108 (or cell 185) is allocated for a user equipment (UE) 304. Thus, only one periodic channel state information (CSI) report 336a-b is generated (i.e., CQI and/or PMI and/or RI for one component carrier (CC) 108 per cell 185 is reported). For aperiodic channel state information (CSI) reports 336c, the rank indication (RI) 334b is transmitted only if the configured CQI/PMI/RI feedback type supports rank indication (RI) 334b reporting. In cases where both a periodic channel state information (CSI) report 336a-b and an aperiodic channel state information (CSI) report 336c would occur in the same subframe, the user equipment (UE) 304 would only transmit the aperiodic channel state information (CSI) report 336c for that subframe.

In Rel-10 and beyond, multiple component carriers (CCs) 108 (or cells 185) may be configured for a user equipment (UE) 304. Thus, multiple periodic channel state information (CSI) reports 336a-b corresponding to multiple component carriers (CCs) 108 (or cells 185) may collide in the same subframe (i.e., the multiple periodic channel state information (CSI) reports 336a-b may have schedules that would force them to be transmitted in the same subframe).

With the introduction of multiple component carriers (CCs) 108 (or cells 185) in Rel-10 or LTE-Advanced (LTE-A), the amount of channel state information (CSI) that needs to be reported can increase significantly, since the channel state information (CSI) report 336 for each of the component carriers (CCs) 108 (or cells 185) needs to be reported. However, the physical uplink control channel (PUCCH) may only be able to support transmission of one channel state information (CSI) report 336 for one component carrier (CC) 108 (or cell 185). When simultaneous physical uplink control channel (PUCCH) and physical uplink shared channel (PUSCH) transmission is enabled, the highest priority periodic channel state information (CSI) report 336a may be carried on the physical uplink control channel (PUCCH) while the remaining periodic channel state information (CSI) reports 336b are carried on the physical uplink shared channel (PUSCH) (or dropped). The priority of different types of uplink control information (UCI) 328 may be provided by the eNode B 302 or by predefined rules. Some of the predefined rules are disclosed herein.

The CQI/PMI/RI 141 of each component carrier (CC) 108 (or cell 185) may be scheduled on the physical uplink control channel (PUCCH) periodically by higher layer 118 signaling (the CQI/PMI/RI 141 is periodic CQI/PMI/RI 141). The eNode B 302 may request periodic channel state information (CSI) 336a-b and aperiodic channel state information (CSI) 336c; the periodic channel state information (CSI) 336a-b may have a periodic reporting schedule while the aperiodic channel state information (CSI) 336c is generated dynamically and not configured by a periodic schedule. The eNode B 102 may also request transmission of CQI/PMI/RI 141. Such a request may be made through the physical downlink control channel (PDCCH) and the CQI/PMI/RI 141 reported in response to such a request may be referred to as aperiodic CQI/PMI/RI 141. The physical uplink control channel (PUCCH) symbol 324 may be sent only on the primary cell (PCell) 185a.

The physical uplink control channel (PUCCH) symbol 324 may further include a format 326 for which the physical uplink control channel (PUCCH) symbol 324 is transmitted. For example, the physical uplink control channel (PUCCH) symbol 324 may be transmitted using Format 1/1a/1b, Format 2/2a/2b, Format 3/3a/3b or any other new formats. As used herein, Format 1/1a/1b represents Format 1 and/or Format 1a and/or Format 1b. Also, as used herein, Format 2/2a/2b represents Format 2 and/or Format 2a and/or Format 2b. Herein, Format 3/3a/3b represents Format 3 and/or Format 3a and/or Format 3b.

The physical uplink control channel (PUCCH) symbol 324 may also include a physical uplink control channel (PUCCH) resource 337. The physical uplink control channel (PUCCH) resource 337 for the periodic CQI/PMI/RI 141 may be periodically pre-assigned by a higher layer 118, which uses Format 2/2a/2b. It may be possible in Rel-10 or a future release to transmit periodic CQI/PMI/RI using Format 3/3a/3b, especially in conjunction with ACK/NACK.

The physical uplink shared channel (PUSCH) symbol 355 may also include uplink control information (UCI) 328b. The uplink control information (UCI) 328b may include one or more aperiodic channel state information (CSI) reports 336c and one or more periodic channel state information (CSI) reports 336b. The number of aperiodic channel state information (CSI) reports 336c and the number of periodic channel state information (CSI) reports 336b may be signaled by the eNode B 302 via radio resource control (RRC) signaling.

An eNode B 302 may trigger aperiodic channel state information (CSI) reporting on the physical uplink shared channel (PUSCH) in an on-demand basis. An aperiodic channel state information (CSI) report 336c may collide with one or more periodic channel state information (CSI) reports 336a-b that are scheduled for the same subframe. Unlike in Rel-8, the aperiodic channel state information (CSI) report 336c in Rel-10 may have channel state information (CSI) for more than one component carrier (CC) 108 (or cell 185). The aperiodic channel state information (CSI) report 336c may include channel state information (CSI) for different component carriers (CCs) 108 (or cells 185) than the periodic channel state information (CSI) reports 336a-b.

Each aperiodic channel state information (CSI) report 336c may include channel state information (CSI) for one or more component carriers (CCs) 108 (or cells 185). An aperiodic channel state information (CSI) report 336c may include channel state information (CSI) for different component carriers (CCs) 108 (or cells 185) from the periodic channel state information (CSI) reports 336*a-b*. In one configuration, an aperiodic channel state information (CSI) report 336*c* may include channel state information (CSI) for only one component carrier (CC) 108 (or cell 185). In another configuration, an aperiodic channel state information (CSI) report 336*c* may include channel state information (CSI) for multiple component carriers (CCs) 108 (or cells 185). In yet another configuration, an aperiodic channel state information (CSI) report 336*c* may be a combination of multiple aperiodic channel state information (CSI) reports 336*c*, each corresponding to one or more component carriers (CCs) 108 (or cells 185). Dropping periodic channel state information (CSI) reports 336*a-b* of one component carrier (CC) 108 (or cell 185) may cause a bad channel estimation of the component carrier (CC) 108 (or cell 185).

An aperiodic channel state information (CSI) report 336*c* may include one or more channel quality indicators (CQIs) 330*b* and/or one or more precoding matrix indicators (PMIs) 332*b* and/or one or more rank indications (RIs) 334*b* of one or more component carriers (CCs) 108 (or cells 185). The channel quality indicator (CQI) 330 may be a wideband channel quality indicator (CQI) 330, a subband channel quality indicator (CQI) 330 or a user equipment (UE) 104 selected subband channel quality indicator (CQI) 330. An aperiodic channel state information (CSI) report 336*c* is always transmitted on the physical uplink shared channel (PUSCH) symbol 355. A periodic channel state information (CSI) report 336*b* may also include a channel quality indicator (CQI) 330*c* and/or a precoding matrix indicator (PMI) 332*c* and/or a rank indication (RI) 334*c* and a priority 310*b*. The physical uplink shared channel (PUSCH) symbol 355 may be sent on the primary cell (PCell) 185*a* and/or on one or more secondary cells (SCell) 185*b*.

When multiple channel state information (CSI) reports 336 from more than one component carrier (CC) 108 (or cell 185) are scheduled to be reported in the same subframe, this may be referred to as a collision. A collision may also occur when different types of channel state information (CSI) from the same component carrier (CC) 108 (or cell 185) (e.g., CQI/PMI and RI) are scheduled to be reported in the same subframe. When a collision occurs, due to the low payload size of the physical uplink control channel (PUCCH), the user equipment (UE) 304 may select only one periodic channel state information (CSI) report 336*a* to be transmitted on the physical uplink control channel (PUCCH). Thus, some of the periodic channel state information (CSI) reports 336*a-b* may be dropped. A dropped channel state information (CSI) report 336*a-b* may be transmitted on the physical uplink shared channel (PUSCH).

Figure 4:
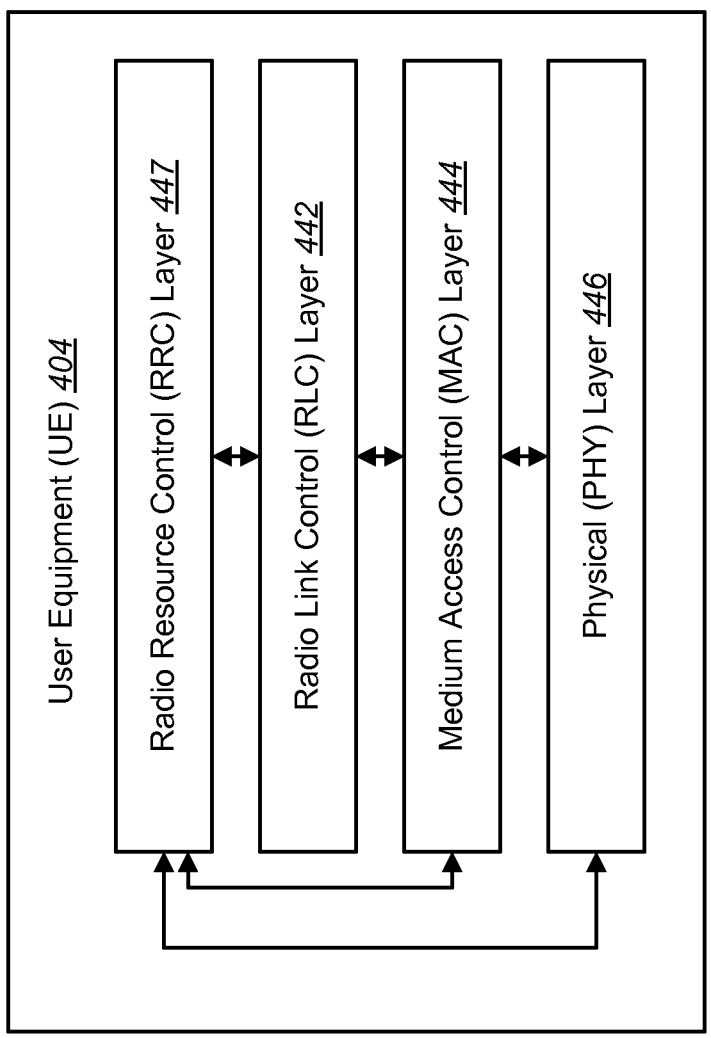
FIG. 4 is a block diagram illustrating the layers used by a user equipment (UE)

FIG. 4 is a block diagram illustrating the layers used by a user equipment (UE) 404. The user equipment (UE) 404 of FIG. 4 may be one configuration of the user equipment (UE) 104 of FIG. 1. The user equipment (UE) 404 may include a radio resource control (RRC) layer 447, a radio link control (RLC) layer 442, a medium access control (MAC) layer 444 and a physical (PHY) layer 446. These layers may be referred to as higher layers 118. The user equipment (UE) 404 may include additional layers not shown in FIG. 4.

Figure 5:
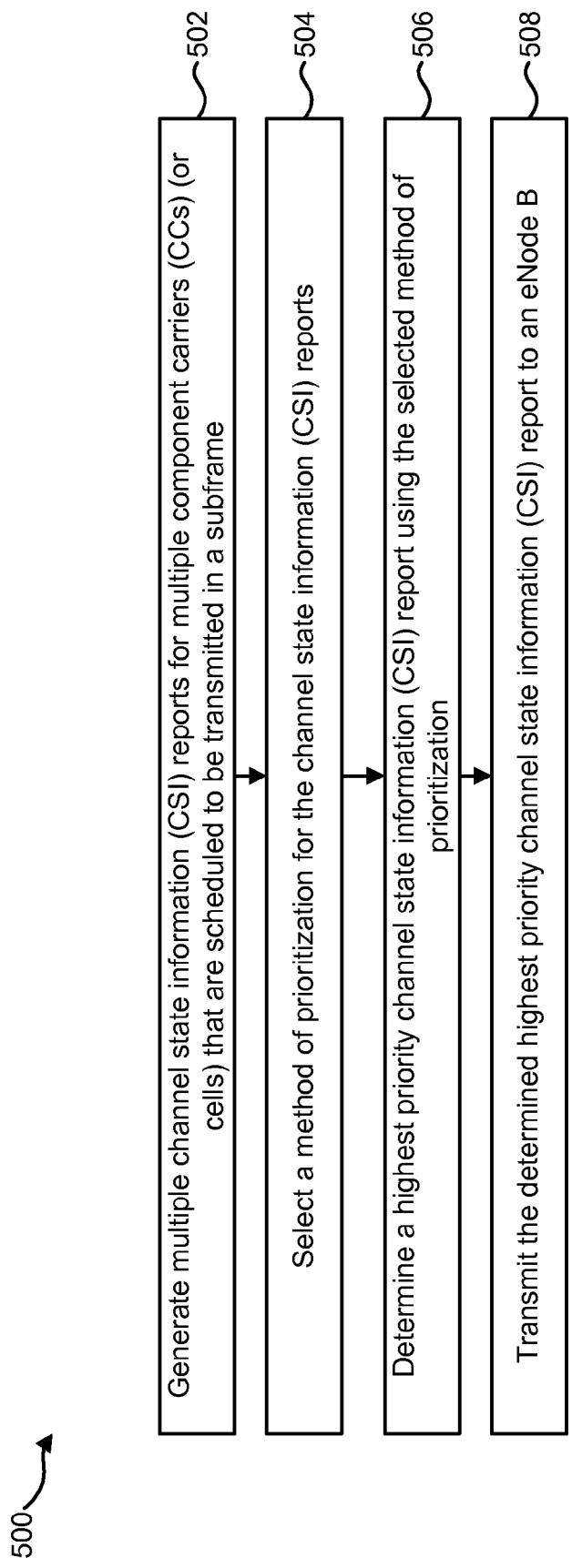
FIG. 5 is a flow diagram of a method for determining a highest priority channel state information (CSI) report.

FIG. 5 is a flow diagram of a method 500 for determining a highest priority channel state information (CSI) report 251. The method 500 may be performed by a user equipment (UE) 104. In one configuration, the method 500 may be performed by a channel state information (CSI) selection module 257 on a user equipment (UE) 104. The user equipment (UE) 104 may generate 502 multiple channel state information (CSI) reports 236 for multiple component carriers (CCs) 108 (or cells 185) that are scheduled to be transmitted in a subframe. Thus, there is a collision between the multiple channel state information (CSI) reports 236. The user equipment (UE) 104 may select 504 a method of prioritization for the channel state information (CSI) reports 236. One method of prioritization for the channel state information (CSI) reports 236 uses the feedback reporting mode 253 of each channel state information (CSI) report 236 and is discussed in additional detail below in relation to FIG. 6. Another method of prioritization for the channel state information (CSI) reports 236 uses the feedback reporting type 243 of each channel state information (CSI) report 236 and is discussed in additional detail below in relation to FIG. 7.

If multiple channel state information (CSI) reports 236 have the same priority using the feedback reporting type 243 of each channel state information (CSI) report 236, the user equipment (UE) 104 may use the number of antenna ports 245 for each channel state information (CSI) report 236 to resolve the ambiguity. This is discussed in additional detail below in relation to FIG. 8. Yet another method of prioritization for the channel state information (CSI) reports 236 uses first the feedback reporting mode 253 and then the feedback reporting type 243. This is discussed in additional detail below in relation to FIG. 9. Still another method of prioritization for the channel state information (CSI) reports 236 uses first the feedback reporting type 243 and then the feedback reporting mode 253. This is discussed in additional detail below in relation to FIG. 10. If multiple channel state information (CSI) reports 236 have the same priority using the feedback reporting type 243 of each channel state information (CSI) report 236, the user equipment (UE) 104 may prioritize the channel state information (CSI) reports 236 within subsets of feedback reporting types 243. This is discussed in additional detail below in relation to FIG. 11. Yet another method of prioritization for the channel state information (CSI) reports 236 uses a priority number 249 defined for each reporting format according to feedback reporting type 253, feedback reporting mode 243, the number of antenna ports 245 and the rank indication (RI) 334. This is discussed in additional detail below in relation to FIG. 12.

The user equipment (UE) 104 may determine 506 a highest priority channel state information (CSI) report 251 using the selected method of prioritization. The user equipment (UE) 104 may then transmit 508 the determined highest priority channel state information (CSI) report 251 to an eNode B 102. In one configuration, the user equipment (UE) 104 may transmit 508 the determined highest priority channel state information (CSI) report 251 to an eNode B 102 using the physical uplink control channel (PUCCH). In another configuration, the user equipment (UE) 104 may transmit 508 the determined highest priority channel state information (CSI) report 251 to an eNode B 102 using the physical uplink shared channel (PUSCH). In yet another configuration, the user equipment (UE) 104 may transmit 508 the determined highest priority channel state information (CSI) report 251 to an eNode B 102 using a simultaneous transmission on both the physical uplink control channel (PUCCH) and the physical uplink shared channel (PUSCH).

One benefit of using different prioritization schemes is that it allows for a more flexible prioritization scheme compared to prioritization based on only radio resource control (RRC) signaling (which can only be changed semi-statically and not dynamically and does not take into account feedback content). Furthermore, using different prioritization schemes allows for prioritization based on the number of feedback bits (e.g., lower payload feedback can be prioritized over higher payload feedback and vice versa).

Figure 6:
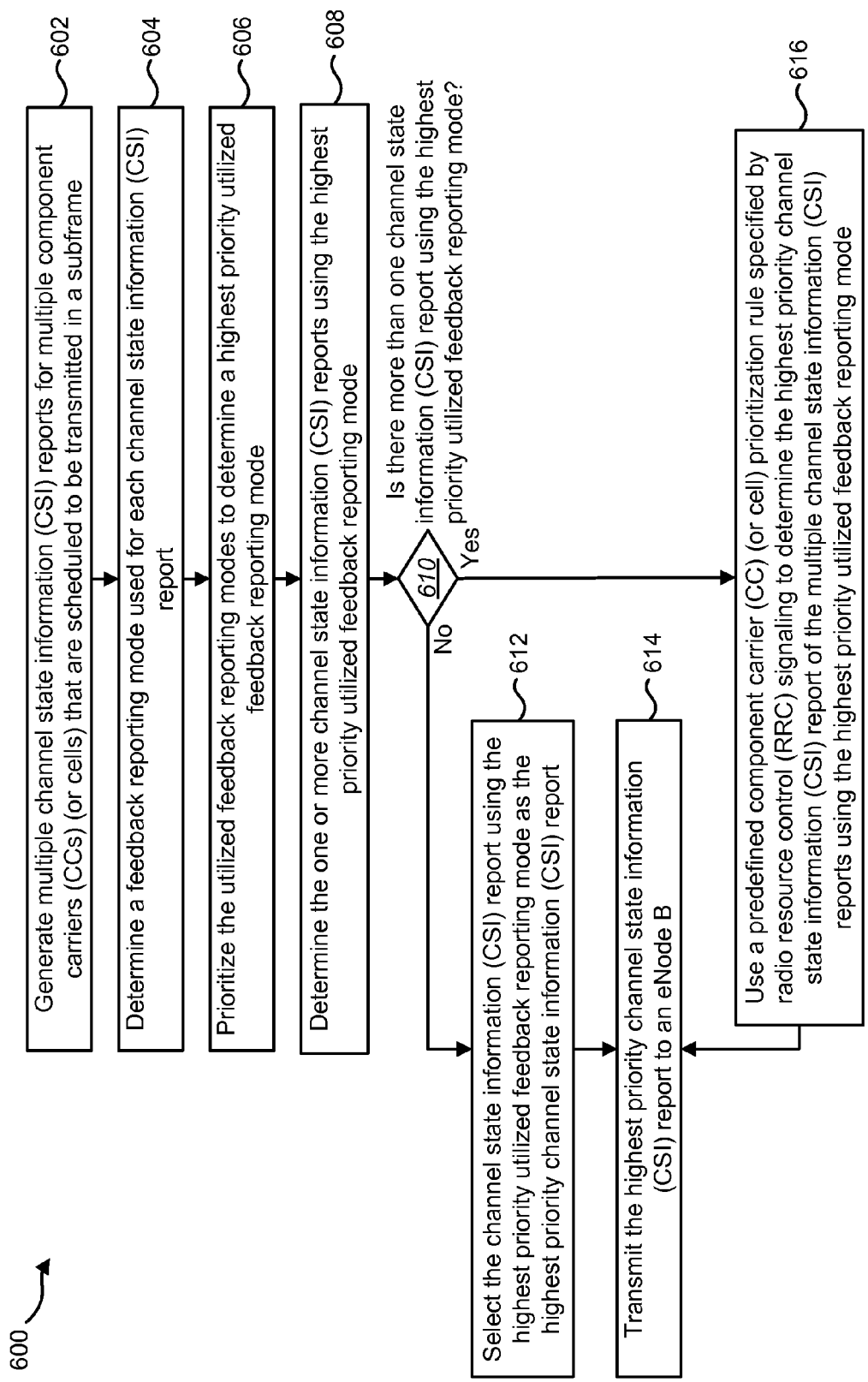
FIG. 6 is a flow diagram of a method for prioritizing channel state information (CSI) reports based on the feedback reporting mode of each channel state information (CSI) report.

FIG. 6 is a flow diagram of a method 600 for prioritizing channel state information (CSI) reports 236 based on the feedback reporting mode 253 of each channel state information (CSI) report 236. The method 600 may be performed by a user equipment (UE) 104. In one configuration, the method 600 may be performed by a channel state information (CSI) selection module 257 on the user equipment (UE) 104. The user equipment (UE) 104 may generate 602 multiple channel state information (CSI) reports 236 for multiple component carriers (CCs) 108 (or cells 185) that are scheduled to be transmitted in a subframe. Thus, a collision may occur between the multiple channel state information (CSI) reports 236.

The user equipment (UE) 104 may determine 604 a feedback reporting mode 253 used for each channel state information (CSI) report 236. A feedback reporting mode 253 used for a channel state information (CSI) report 236 may be referred to as a utilized feedback reporting mode 253. In other words, only those feedback reporting modes 253 used for a channel state information (CSI) report 236 scheduled to be transmitted in the subframe are referred to as utilized feedback reporting modes 253. The user equipment (UE) 104 may then prioritize 606 the utilized feedback reporting modes 253 to determine a highest priority utilized feedback reporting mode 253 (i.e., the feedback reporting mode 253 with the highest priority of all the feedback reporting modes 253 scheduled to be transmitted in this particular subframe).

As can be seen from Table 2 above, mode 1-1 and mode 2-1 are mainly used for MIMO transmission (usually, higher-order spatial multiplexing schemes through closed loop rank-1 is also included in these modes), while mode 1-0 and mode 2-0 are used for single antenna transmissions (transmit diversity and open loop spatial multiplexing may also be included in these modes). Therefore, one method of prioritizing multiple channel state information (CSI) reports 236 is to prioritize mode 1-1 and mode 2-1 over mode 1-0 and mode 2-0. Furthermore, a wideband channel quality indicator (CQI) 330 may be prioritized over the UE-selected channel quality indicator (CQI) (subband CQI) 330. Thus, mode 1-1 may be prioritized over mode 2-1 and mode 1-0 may be prioritized over mode 2-0. Hence, one form of prioritization may place mode 1-1 as the highest priority, followed by mode 2-1, mode 1-0 and finally mode 2-0.

However, since the subband feedback usually has information about the subbands (hence, more information compared to wideband feedback), it may be beneficial to prioritize subband feedback over wideband feedback. In this case, mode 2-1 may have the highest priority, followed by mode 1-1, mode 2-0 and finally mode 1-0. Alternatively, single antenna transmission may be preferred over higher-order MIMO transmission. In this case, mode 1-0 may have the highest priority, followed by mode 2-0, mode 1-1 and finally mode 2-1. If subband feedback is prioritized over wideband feedback and single antenna transmission is prioritized over higher-order MIMO transmission, then mode 2-0 may have the highest priority, followed by mode 1-0, mode 2-1 and finally mode 1-1.

In yet another configuration, wideband feedback may be prioritized over subband feedback, such that mode 1-1 has the highest priority, followed by mode 1-0, mode 2-1 and finally mode 2-0. Or, subband feedback may be prioritized over wideband feedback such that mode 2-1 has the highest priority, followed by mode 2-0, mode 1-1 and finally mode 1-0. The benefit of using different methods of prioritization is that MIMO transmission can at times be prioritized over single antenna transmission and at other times, single antenna transmission can be prioritized over MIMO transmission as necessary.

The user equipment (UE) 104 may determine 608 the one or more channel state information (CSI) reports 236 that use the highest priority utilized feedback reporting mode 253. The user equipment (UE) 104 may then determine 610 whether more than one channel state information (CSI) report 236 is using the highest priority utilized feedback reporting mode 253. For example, if the prioritization is such that mode 1-1 has the highest priority, followed by mode 2-1, mode 1-0 and finally mode 2-0, the user equipment (UE) 104 may first determine whether any of the channel state information (CSI) reports 236 use mode 1-1. If none of the channel state information (CSI) reports 236 use mode 1-1, the user equipment (UE) 104 may determine whether any of the channel state information (CSI) reports 236 use mode 2-1. If one or more channel state information (CSI) reports 236 use mode 2-1 (and thus mode 2-1 is the highest priority utilized feedback reporting mode 253), the user equipment (UE) 104 may then determine whether multiple channel state information (CSI) reports 236 use mode 2-1. This is to resolve a conflict if multiple channel state information (CSI) reports 236 use the same feedback reporting mode 253.

If there is only one channel state information (CSI) report 236 using the highest priority utilized feedback reporting mode 253, the user equipment (UE) 104 may select 612 the channel state information (CSI) report 236 with the highest priority utilized feedback reporting mode 253 as the highest priority channel state information (CSI) report 251. The user equipment (UE) 104 may then transmit 614 the highest priority channel state information (CSI) report 251 to an eNode B 102. The user equipment (UE) 104 may transmit 614 the highest priority channel state information (CSI) report 251 to an eNode B 102 using the physical uplink control channel (PUCCH).

If there are multiple channel state information (CSI) reports 236 using the highest priority utilized feedback reporting mode 253, the user equipment (UE) 104 may use 616 a predefined component carrier (CC) 108 (or cell 185) prioritization rule specified by radio resource control (RRC) signaling to determine the highest priority channel state information (CSI) report 251 of the multiple channel state information (CSI) reports 236 using the highest priority utilized feedback reporting mode 253. The prioritization rule specified by radio resource control (RRC) signaling may prioritize channel state information (CSI) reports 236 based on the corresponding component carrier (CC) 108 (or cell 185) 247 of each channel state information (CSI) report 236 (e.g., CC1>CC2>CC3). The user equipment (UE) 104 may then transmit 614 the highest priority channel state information (CSI) report 251 to an eNode B 102. In one configuration, the user equipment (UE) 104 may transmit 614 the highest priority channel state information (CSI) report 251 to eNode B 102 using the physical uplink control channel (PUCCH).

Figure 7:
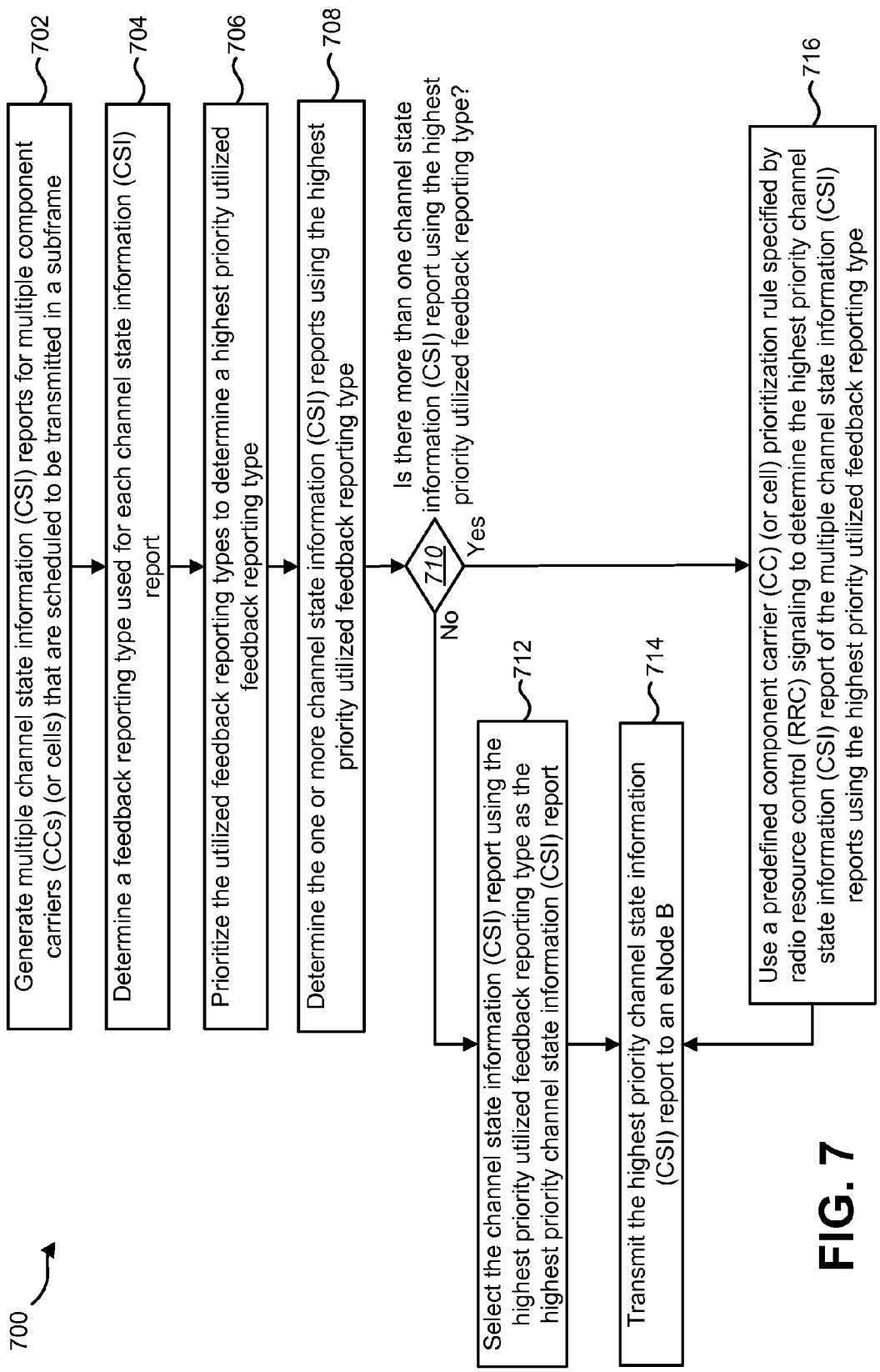
FIG. 7 is a flow diagram of a method for prioritizing channel state information (CSI) reports based on the feedback reporting type of each channel state information (CSI) report.

FIG. 7 is a flow diagram of a method 700 for prioritizing channel state information (CSI) reports 236 based on the feedback reporting type 243 of each channel state information (CSI) report 236. The method 700 may be performed by a user equipment (UE) 104. In one configuration, the method 700 may be performed by a channel state information (CSI) selection module 257 on the user equipment (UE) 104. The user equipment (UE) 104 may generate 702 multiple channel state information (CSI) reports 236 for multiple component carriers (CCs) 108 (or cells 185) that are scheduled to be transmitted in a subframe. Thus, a collision may occur between the multiple channel state information (CSI) reports 236.

The user equipment (UE) 104 may determine 704 a feedback reporting type 243 used for each channel state information (CSI) report 236. A feedback reporting type 243 used by a channel state information (CSI) report 236 may be referred to as a utilized feedback reporting type 243. In other words, only those feedback reporting types 243 used by a channel state information (CSI) report 236 that is scheduled to be transmitted in the subframe are referred to as utilized feedback reporting types 243. The user equipment (UE) 104 may then prioritize 706 the utilized feedback reporting types 243 to determine a highest priority utilized feedback reporting type 243 (i.e., the feedback reporting type 243 with the highest priority of all the feedback reporting types 243 used for channel state information (CSI) reports 236 scheduled for this particular subframe). Many different prioritizations of feedback reporting types 243 may be used.

For example, in LTE-A, one form of prioritization is such that feedback reporting types {3, 5, 6} 243 are prioritized over feedback reporting types {2, 2a, 2b, 2c, 4} 243, which are prioritized over feedback reporting types {1, 1a} 243. As another example, the feedback reporting types {3, 5, 6} 243 may be prioritized over the feedback reporting types {2, 2a, 2b, 2c} 243, which may be prioritized over the feedback reporting type {4} 243, which may be prioritized over the feedback reporting types {1, 1a} 243. Or, the feedback reporting types {3, 5, 6} 243 may be prioritized over the feedback reporting type {4} 243, which may be prioritized over the feedback reporting types {2, 2a, 2b, 2c} 243, which may be prioritized over the feedback reporting types {1, 1a} 243.

The user equipment (UE) 104 may determine 708 the one or more channel state information (CSI) reports 236 using the highest priority utilized feedback reporting type 243. The user equipment (UE) 104 may then determine 710 whether more than one channel state information (CSI) report 236 is using the highest priority utilized feedback reporting type 243. In other words, the user equipment (UE) 104 may determine whether a collision may occur between channel state information (CSI) reports 236 for different component carriers (CCs) 108 (or cells 185) that are within the same feedback reporting type 243 subset. If there is only one channel state information (CSI) report 236 with the highest priority utilized feedback reporting type 243, the user equipment (UE) 104 may select 712 the channel state information (CSI) report 236 with the highest priority utilized feedback reporting type 243 as the highest priority channel state information (CSI) report 251. The user equipment (UE) 104 may then transmit 714 the highest priority channel state information (CSI) report 251 to an eNode B 102. In one configuration, the user equipment (UE) 104 may transmit 714 the highest priority channel state information (CSI) report 251 to an eNode B 104 using the physical uplink control channel (PUCCH).

If more than one channel state information (CSI) report 236 is using the highest priority utilized feedback reporting type 243, the user equipment (UE) 104 may use 716 a predefined component carrier (CC) 108 (or cell 185) prioritization rule specified by radio resource control (RRC) signaling to determine the highest priority channel state information (CSI) report 251 of the multiple channel state information (CSI) reports 236 using the highest priority utilized feedback reporting type 243. For example, if the highest priority utilized feedback reporting type 243 is the feedback reporting type subset {3, 5, 6} 243, where a first channel state information (CSI) report 236 corresponding to CC1 is using feedback reporting type {3} 243 and a second channel state information (CSI) report 236 corresponding to CC2 is using feedback reporting type {5} 243, a prioritization rule specified by radio resource control (RRC) signaling (e.g., CC1>CC2>CC3) may determine that the first channel state information (CSI) report 236 has a higher priority than the second channel state information (CSI) report 236. Thus, the first channel state information (CSI) report 236 may be determined to be the highest priority channel state information (CSI) report 251. The user equipment (UE) 104 may then transmit 714 the highest priority channel state information (CSI) report 251 to an eNode B 102. In one configuration, the user equipment (UE) 104 may transmit 714 the highest priority channel state information (CSI) report 251 to an eNode B 102 using the physical uplink control channel (PUCCH). One benefit of this method is that it allows Rel-8 prioritization rules to be extended for Rel-10, taking into account the new feedback reporting types (2a, 2b, 2c, 5 and 6) 243.

Figure 8:
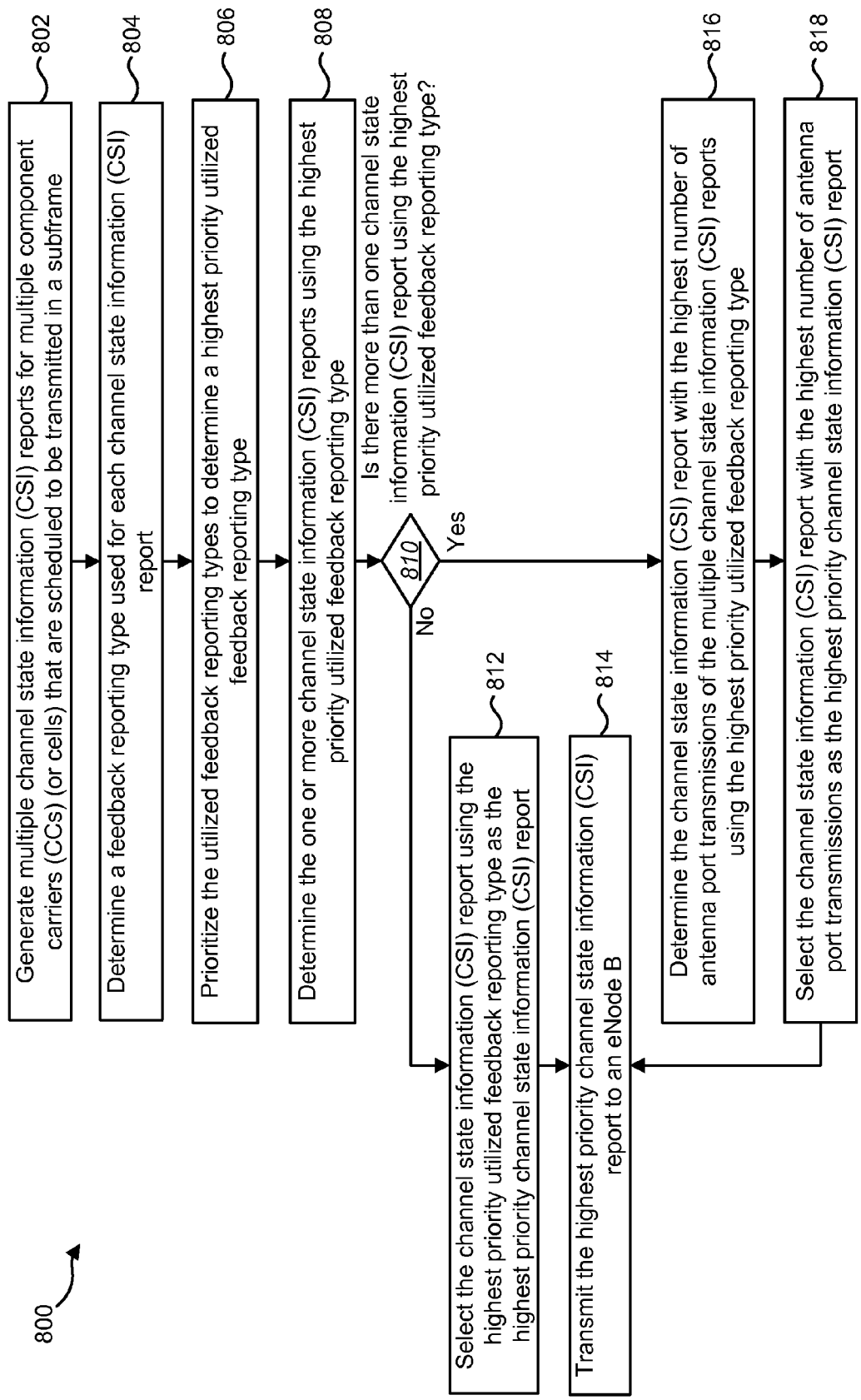
FIG. 8 is a flow diagram of another method for prioritizing channel state information (CSI) reports based on the feedback reporting type of each channel state information (CSI) report.

FIG. 8 is a flow diagram of another method 800 for prioritizing channel state information (CSI) reports 236 based on the feedback reporting type 243 of each channel state information (CSI) report 236. The channel state information (CSI) reports 236 may be further prioritized based on the number of antenna ports 245 for each channel state information (CSI) report 236. The method 800 may be performed by a user equipment (UE) 104. In one configuration, the method 800 may be performed by a channel state information (CSI) selection module 257 on the user equipment (UE) 104. The user equipment (UE) 104 may generate 802 multiple channel state information (CSI) reports 236 for multiple component carriers (CCs) 108 (or cells 185) that are scheduled to be transmitted in a subframe. Thus, a collision may occur between the multiple channel state information (CSI) reports 236.

The user equipment (UE) 104 may determine 804 a feedback reporting type 243 used for each channel state information (CSI) report 236. A feedback reporting type 243 used by a channel state information (CSI) report 236 may be referred to as a utilized feedback reporting type 243. In other words, only those feedback reporting types 243 used by a channel state information (CSI) report 236 scheduled to be transmitted in the subframe are referred to as utilized feedback reporting types 243. The user equipment (UE) 104 may then prioritize 806 the utilized feedback reporting types 243 to determine a highest priority utilized feedback reporting type 243 (i.e., the feedback reporting type 243 with the highest priority of all the feedback reporting types 243 used for this particular subframe). The many methods for prioritizing feedback reporting types 243 were discussed above in relation to FIG. 7.

The user equipment (UE) 104 may determine 808 the one or more channel state information (CSI) reports 236 with the highest priority utilized feedback reporting type 243. The user equipment (UE) 104 may then determine 810 whether more than one channel state information (CSI) report 236 uses the highest priority utilized feedback reporting type 243. In other words, the user equipment (UE) 104 may determine whether a collision may occur between channel state information (CSI) reports 236 for different component carriers (CCs) 108 (or cells 185) that are within the same feedback reporting type 243 subset. If there is only one channel state information (CSI) report 236 with the highest priority utilized feedback reporting type 243, the user equipment (UE) 104 may select 812 the channel state information (CSI) report 236 with the highest priority utilized feedback reporting type 243 as the highest priority channel state information (CSI) report 251. The user equipment (UE) 104 may then transmit 814 the highest priority channel state information (CSI) report 251 to an eNode B 102. In one configuration, the user equipment (UE) 104 may transmit 814 the highest priority channel state information (CSI) report 251 to an eNode B 102 using the physical uplink control channel (PUCCH).

If more than one channel state information (CSI) report 236 uses the highest priority utilized feedback reporting type 243, the user equipment (UE) 104 may prioritize the channel state information (CSI) reports 236 according to the number of antenna ports 245. The user equipment (UE) 104 may determine 816 the channel state information (CSI) report 236 with the highest number of antenna ports 245 of the multiple channel state information (CSI) reports 236 with the highest priority utilized feedback reporting type 243. For example, the user equipment (UE) 104 may prioritize the feedback reporting type {1a} 243 over the feedback reporting type {1} 243 because the feedback reporting type {1a} 243 is used specifically for eight antenna port transmission.

Alternatively, if MIMO is not considered important, the feedback reporting type {1} 243 may be prioritized over the feedback reporting type {1a} 243. As another example, if eight antenna port transmission is preferred over two or four antenna port transmission, the feedback reporting types {2a, 2b, 2c} 243 may be prioritized over the feedback reporting type {2} 243. Alternatively, if two or four antenna port transmission is preferred, the feedback reporting type {2} 243 may be prioritized over the feedback reporting type {2a, 2b, 2c} 243. Furthermore, the feedback reporting type {2c} 243 (wideband CQI/first PMI/second PMI) may be prioritized over the feedback reporting type {2b} 243 (wideband CQI/second PMI), which is in turn prioritized over the feedback reporting type {2a} 243 (wideband first PMI). For simplicity, it may also be possible to prioritize the feedback reporting type {2a} 243 over the feedback reporting type {2b} 243, which is prioritized over the feedback reporting type {2c} 243.

The user equipment (UE) 104 may select 818 the channel state information (CSI) report 236 with the highest number of antenna ports 245 as the highest priority channel state information (CSI) report 251. The user equipment (UE) 104 may then transmit 814 the highest priority channel state information (CSI) report 251 to an eNode B 102. In one configuration, the user equipment (UE) 104 may transmit 814 the highest priority channel state information (CSI) report 251 to an eNode B 102 using the physical uplink control channel (PUCCH).

Figure 9:
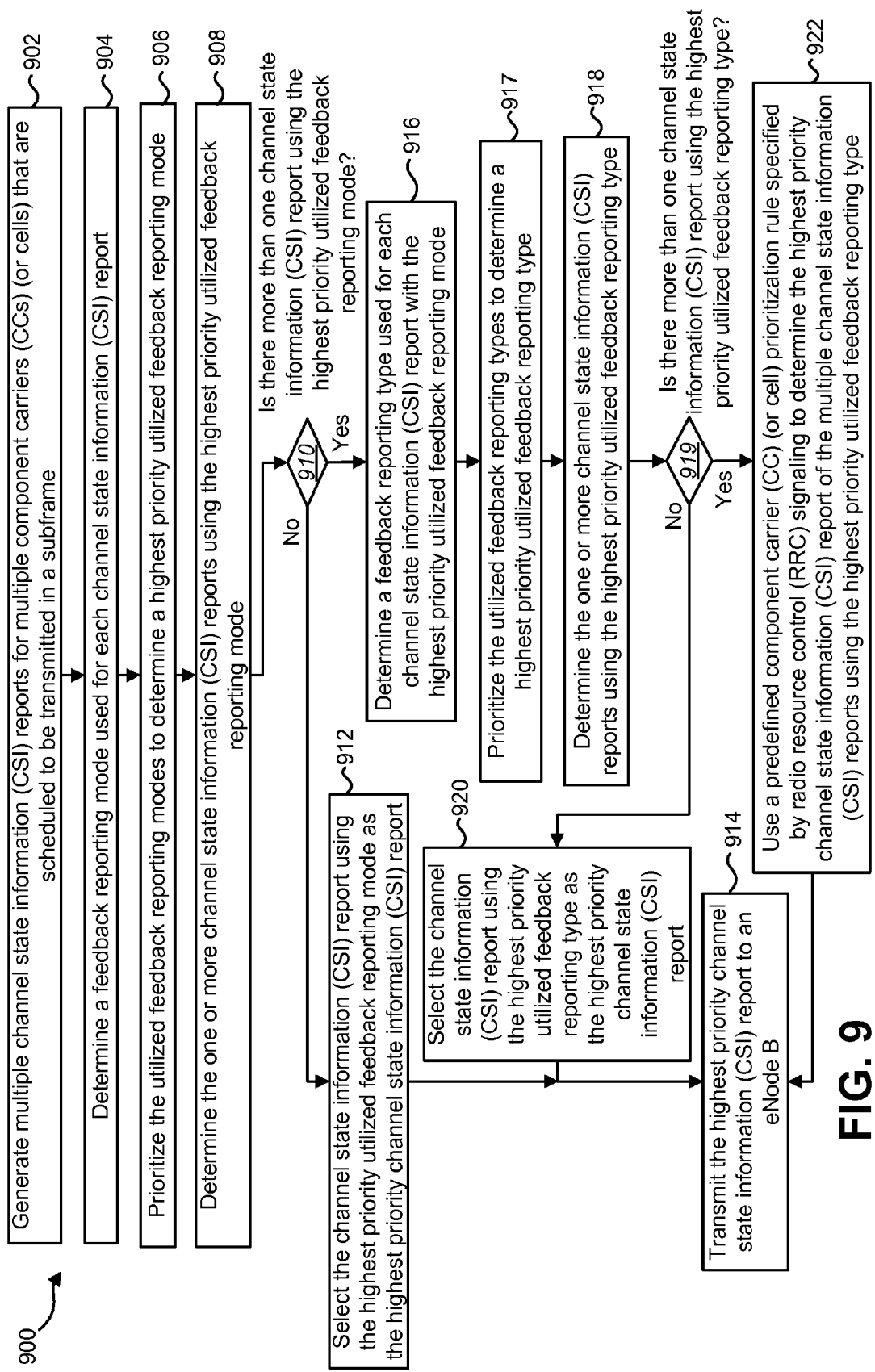
FIG. 9 is a flow diagram of a method for prioritizing channel state information (CSI) reports using the feedback reporting mode followed by the feedback reporting type.

FIG. 9 is a flow diagram of a method 900 for prioritizing channel state information (CSI) reports 236 using the feedback reporting mode 253 followed by the feedback reporting type 243. The method 900 may be performed by a user equipment (UE) 104. In one configuration, the method 900 may be performed by a channel state information (CSI) selection module 257 on the user equipment (UE) 104. The user equipment (UE) 104 may generate 902 multiple channel state information (CSI) reports 236 for multiple component carriers (CCs) 108 (or cells 185) that are scheduled to be transmitted in a subframe. Thus, a collision may occur between the multiple channel state information (CSI) reports 236.

The user equipment (UE) 104 may determine 904 a feedback reporting mode 253 used for each channel state information (CSI) report 236. As discussed above, a feedback reporting mode 253 used for a channel state information (CSI) report 236 may be referred to as a utilized feedback reporting mode 253. The user equipment (UE) 104 may then prioritize 906 the utilized feedback reporting modes 253 to determine a highest priority utilized feedback reporting mode 253 (i.e., the feedback reporting mode 253 with the highest priority of all the feedback reporting modes 253 used for channel state information (CSI) report 236 scheduled for transmission in this particular subframe). This was discussed above in relation to FIG. 6.

The user equipment (UE) 104 may determine 908 the one or more channel state information (CSI) reports 236 that have the highest priority utilized feedback reporting mode 253. The user equipment (UE) 104 may then determine 910 whether more than one channel state information (CSI) report 236 is using the highest priority utilized feedback reporting mode 253. If there is only one channel state information (CSI) report 236 using the highest priority utilized feedback reporting mode 253, the user equipment (UE) 104 may select 912 the channel state information (CSI) report 236 with the highest priority utilized feedback reporting mode 253 as the highest priority channel state information (CSI) report 251. The user equipment (UE) 104 may then transmit 914 the highest priority channel state information (CSI) report 251 to an eNode B 102. The user equipment (UE) 104 may transmit 914 the highest priority channel state information (CSI) report 251 to an eNode B 102 using the physical uplink control channel (PUCCH).

If there are multiple channel state information (CSI) reports 236 using the highest priority utilized feedback reporting mode 253, the user equipment (UE) 104 may determine 916 a feedback reporting type 243 used for each of the channel state information (CSI) reports 236 with the highest priority utilized feedback reporting mode 253. A feedback reporting type 243 used by a channel state information (CSI) report 236 may be referred to as a utilized feedback reporting type 243. The user equipment (UE) 104 may then prioritize 917 the utilized feedback reporting types 243 to determine a highest priority utilized feedback reporting type 243 (i.e., the feedback reporting type 243 with the highest priority of all the feedback reporting types 243 used for a channel state information (CSI) report 236 that is scheduled for transmission in this particular subframe). The methods for determining the priority of feedback reporting types 236 were discussed above in relation to FIG. 7.

The user equipment (UE) 104 may determine 918 the one or more channel state information (CSI) reports 236 using the highest priority utilized feedback reporting type 243. The user equipment (UE) 104 may then determine 919 whether more than one channel state information (CSI) report 236 is using the highest priority utilized feedback reporting type 243. In other words, the user equipment (UE) 104 may determine whether a collision may occur between channel state information (CSI) reports 236 for different component carriers (CCs) 108 (or cells 185) that are within the same feedback reporting type 243 subset. If there is only one channel state information (CSI) report 236 with the highest priority utilized feedback reporting type 243, the user equipment (UE) 104 may select 920 the channel state information (CSI) report 236 with the highest priority utilized feedback reporting type 243 as the highest priority channel state information (CSI) report 251. The user equipment (UE) 104 may then transmit 914 the highest priority channel state information (CSI) report 251 to an eNode B 102. In one configuration, the user equipment (UE) 104 may transmit 914 the highest priority channel state information (CSI) report 251 to an eNode B 102 using the physical uplink control channel (PUCCH).

If more than one channel state information (CSI) report 236 is using the highest priority utilized feedback reporting type 243, the user equipment (UE) 104 may use 922 a predefined component carrier (CC) 108 (or cell 185) prioritization rule specified by radio resource control (RRC) signaling to determine the highest priority channel state information (CSI) report 251 of the multiple channel state information (CSI) reports 236 using the highest priority utilized feedback reporting type 243. The user equipment (UE) 104 may then transmit 914 the highest priority channel state information (CSI) report 251 to an eNode B 102. In one configuration, the user equipment (UE) 104 may transmit 914 the highest priority channel state information (CSI) report 236 to an eNode B 102 using the physical uplink control channel (PUCCH).

For example, suppose that a first component carrier (CC) 108 (or cell 185) CC1 is using mode 1-1, a second component carrier (CC) 108 (or cell 185) CC2 is using mode 1-1 and a third component carrier (CC) 108 (or cell 185) CC3 is using mode 1-0. Furthermore, suppose that in a given subframe, CC1 has a channel state information (CSI) report 236 using the feedback reporting type {2} 243, CC2 has a channel state information (CSI) report 236 using the feedback reporting type {3} 243 and CC3 has a channel state information (CSI) report 236 using the feedback reporting type {3} 243.

As shown in Table 3 above, each feedback reporting mode 253 has a different feedback reporting type 243 associated with it. For instance, the feedback reporting mode 1-1 253 is associated with the feedback reporting types {2, 2b, 2c, 3, 5} 243, the feedback reporting mode 2-1 253 is associated with the feedback reporting types {1, 1a, 2, 2a, 2b, 3, 6} 243, the feedback reporting mode 1-0 253 is associated with the feedback reporting types {3, 4} 243 and the feedback reporting mode 2-0 253 is associated with the feedback reporting types {1, 3, 4} 243.

Using one of the prioritization methods discussed above in relation to FIG. 6, mode 1-1 may be prioritized over mode 1-0. Thus, the channel state information (CSI) report 236 corresponding to CC1 and the channel state information (CSI) report 236 corresponding to CC2 are prioritized over the channel state information (CSI) report 236 corresponding to CC3. The channel state information (CSI) report 236 corresponding to CC3 is dropped.

Since both the channel state information (CSI) report 236 corresponding to CC1 and the channel state information (CSI) report 236 corresponding to CC2 have the same feedback reporting mode 253, the user equipment (UE) 104 may use the feedback reporting type 243 to prioritize the channel state information (CSI) reports 236. Using one of the prioritization methods discussed above in relation to FIG. 7 for LTE-A, the feedback reporting types {3, 5, 6} 243 are prioritized over the feedback reporting types {2, 2a, 2b, 2c, 4} 243. Thus, the channel state information (CSI) report 236 corresponding to CC2 with a feedback reporting type {3} 243 has a higher priority than the channel state information (CSI) report 236 corresponding to CC1 with a feedback reporting type {2} 243. Hence, the channel state information (CSI) report 236 corresponding to CC2 may be selected as the highest priority channel state information (CSI) report 236 and transmitted on the physical uplink control channel (PUCCH) to an eNode B 102.

If only a feedback reporting type 243 based prioritization was used (such as was discussed above in relation to FIG. 7), the channel state information (CSI) report 236 corresponding to CC2 and the channel state information (CSI) report 236 corresponding to CC3 would be selected (and the channel state information (CSI) report 236 corresponding to CC2 would be dropped). Then, a predefined component carrier (CC) 108 (or cell 185) prioritization rule specified by radio resource control (RRC) signaling would be used to determine whether to transmit the channel state information (CSI) report 236 corresponding to CC2 or the channel state information (CSI) report 236 corresponding to CC3. Thus, very different results may be obtained using different methods of prioritization.

Figure 10:
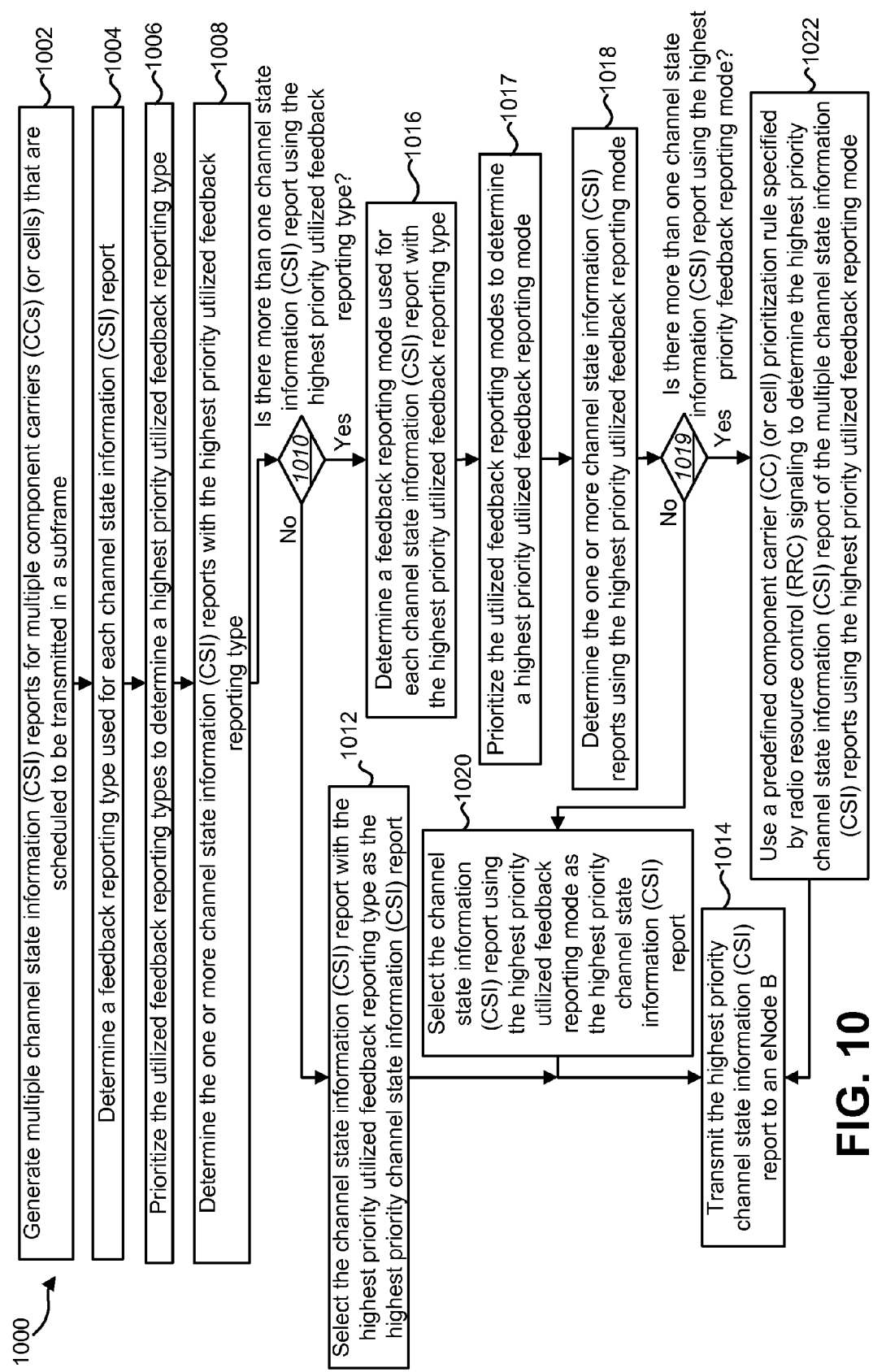
FIG. 10 is a flow diagram of a method for prioritizing channel state information (CSI) reports using the feedback reporting type followed by the feedback reporting mode.

FIG. 10 is a flow diagram of a method 1000 for prioritizing channel state information (CSI) reports 236 using the feedback reporting type 243 followed by the feedback reporting mode 253. The method 1000 may be performed by a user equipment (UE) 104. In one configuration, the method 1000 may be performed by a channel state information (CSI) selection module 257 on the user equipment (UE) 104. The user equipment (UE) 104 may generate 1002 multiple channel state information (CSI) reports 236 for multiple component carriers (CCs) 108 (or cells 185) that are scheduled to be transmitted in a subframe. Thus, a collision may occur between the multiple channel state information (CSI) reports 236.

The user equipment (UE) 104 may determine 1004 a feedback reporting type 243 used for each channel state information (CSI) report 236. As discussed above, a feedback reporting type 243 used for a channel state information (CSI) report 236 may be referred to as a utilized feedback reporting type 243. The user equipment (UE) 104 may then prioritize 1006 the utilized feedback reporting types 243 to determine a highest priority utilized feedback reporting type 243 (i.e., the feedback reporting type 243 with the highest priority of all the feedback reporting types 243 used for channel state information (CSI) reports 236 scheduled for this particular subframe). This was discussed above in relation to FIG. 7.

The user equipment (UE) 104 may determine 1008 the one or more channel state information (CSI) reports 236 that have the highest priority utilized feedback reporting type 243. The user equipment (UE) 104 may then determine 1010 whether more than one channel state information (CSI) report 236 is using the highest priority utilized feedback reporting type 243. If there is only one channel state information (CSI) report 236 using the highest priority utilized feedback reporting type 243, the user equipment (UE) 104 may select 1012 the channel state information (CSI) report 236 with the highest priority utilized feedback reporting type 243 as the highest priority channel state information (CSI) report 251. The user equipment (UE) 104 may then transmit 1014 the highest priority channel state information (CSI) report 251 to an eNode B 102. The user equipment (UE) 104 may transmit 1014 the highest priority channel state information (CSI) report 251 to an eNode B 102 using the physical uplink control channel (PUCCH).

If there are multiple channel state information (CSI) reports 236 using the highest priority utilized feedback reporting type 243, the user equipment (UE) 104 may determine 1016 a feedback reporting mode 253 used for each of the channel state information (CSI) reports 236 with the highest priority utilized feedback reporting type 243. A feedback reporting mode 253 used by a channel state information (CSI) report 236 may be referred to as a utilized feedback reporting mode 253. The user equipment (UE) 104 may then prioritize 1017 the utilized feedback reporting modes 253 to determine a highest priority utilized feedback reporting mode 253 (i.e., the feedback reporting mode 253 with the highest priority of all the feedback reporting modes 253 used by channel state information (CSI) reports 236 scheduled for this particular subframe). The methods for determining the priority of feedback reporting modes 253 were discussed above in relation to FIG. 6.

The user equipment (UE) 104 may determine 1018 the one or more channel state information (CSI) reports 236 using the highest priority utilized feedback reporting mode 253. The user equipment (UE) 104 may then determine 1019 whether more than one channel state information (CSI) report 236 is using the highest priority utilized feedback reporting mode 253. In other words, the user equipment (UE) 104 may determine whether a collision may occur between channel state information (CSI) reports 236 for different component carriers (CCs) 108 (or cells 185) that are using the same feedback reporting mode 253. If there is only one channel state information (CSI) report 236 with the highest priority utilized feedback reporting mode 236, the user equipment (UE) 104 may select 1020 the channel state information (CSI) report 236 with the highest priority utilized feedback reporting mode 253 as the highest priority channel state information (CSI) report 251. The user equipment (UE) 104 may then transmit 1014 the highest priority channel state information (CSI) report 251 to an eNode B 102. In one configuration, the user equipment (UE) 104 may transmit 1014 the highest priority channel state information (CSI) report 251 to an eNode B 102 using the physical uplink control channel (PUCCH).

If more than one channel state information (CSI) report 236 is using the highest priority utilized feedback reporting mode 253, the user equipment (UE) 104 may use 1022 a predefined component carrier (CC) 108 (or cell 185) prioritization rule specified by radio resource control (RRC) signaling to determine the highest priority channel state information (CSI) report 251 of the multiple channel state information (CSI) reports 236 using the highest priority utilized feedback reporting mode 253. The user equipment (UE) 104 may then transmit 1014 the highest priority channel state information (CSI) report 251 to an eNode B 102. In one configuration, the user equipment (UE) 104 may transmit 1014 the highest priority channel state information (CSI) report 251 to an eNode B 102 using the physical uplink control channel (PUCCH).

For example, suppose that a first component carrier (CC) 108 (or cell 185) CC1 is using mode 1-1, a second component carrier (CC) 108 (or cell 185) CC2 is using mode 1-1 and a third component carrier (CC) 108 (or cell 185) CC3 is using mode 1-0. Furthermore, suppose that in a given subframe, CC1 has a channel state information (CSI) report 236 using the feedback reporting type {2} 243, CC2 has a channel state information (CSI) report 236 using the feedback reporting type {3} 243 and CC3 has a channel state information (CSI) report 236 using the feedback reporting type {3} 243.

As shown in Table 3 above, each feedback reporting mode 253 has a different feedback reporting type associated with it. For instance, the feedback reporting mode 1-1 253 is associated with the feedback reporting types {2, 2b, 2c, 3, 5} 243, the feedback reporting mode 2-1 253 is associated with the feedback reporting types {1, 1a, 2, 2a, 2b, 3, 6} 243, the feedback reporting mode 1-0 253 is associated with the feedback reporting types {3, 4} 243 and the feedback reporting mode 2-0 253 is associated with the feedback reporting types {1, 3, 4} 243.

Using one of the prioritization methods discussed above in relation to FIG. 7, feedback reporting type {3} 243 may be prioritized over feedback reporting type {2} 243. Thus, the channel state information (CSI) report 236 corresponding to CC2 and the channel state information (CSI) report 236 corresponding to CC3 are prioritized over the channel state information (CSI) report 236 corresponding to CC1. The channel state information (CSI) report 236 corresponding to CC1 is dropped.

Since both the channel state information (CSI) report 236 corresponding to CC2 and the channel state information (CSI) report 236 corresponding to CC3 have the same feedback reporting type 243, the user equipment (UE) 104 may use the feedback reporting mode 253 to prioritize the channel state information (CSI) reports 236. Using one of the prioritization methods discussed above in relation to FIG. 6 (i.e., mode 1-1>mode 1-0), the feedback reporting mode 1-1 253 is prioritized over the feedback reporting mode 1-0 253. Thus, the channel state information (CSI) report 236 corresponding to CC2 with a feedback reporting type {3} 243 and a feedback reporting mode 1-1 253 has a higher priority than the channel state information (CSI) report 236 corresponding to CC3 with a feedback reporting type {2} 243 and a feedback reporting mode 1-0 253. Hence, the channel state information (CSI) report 236 corresponding to CC2 may be selected as the highest priority channel state information (CSI) report 251 and transmitted on the physical uplink control channel (PUCCH) to an eNode B 102.

In this particular example, the channel state information (CSI) report 236 corresponding to CC2 was selected (the same channel state information (CSI) report 236 was selected using the method of FIG. 10 as using the method of FIG. 9). However, in general, using feedback reporting mode 253 prioritization followed by feedback reporting type 243 prioritization can lead to a different result compared with using feedback reporting type 243 prioritization followed by feedback reporting mode 253 prioritization.

Figure 11:
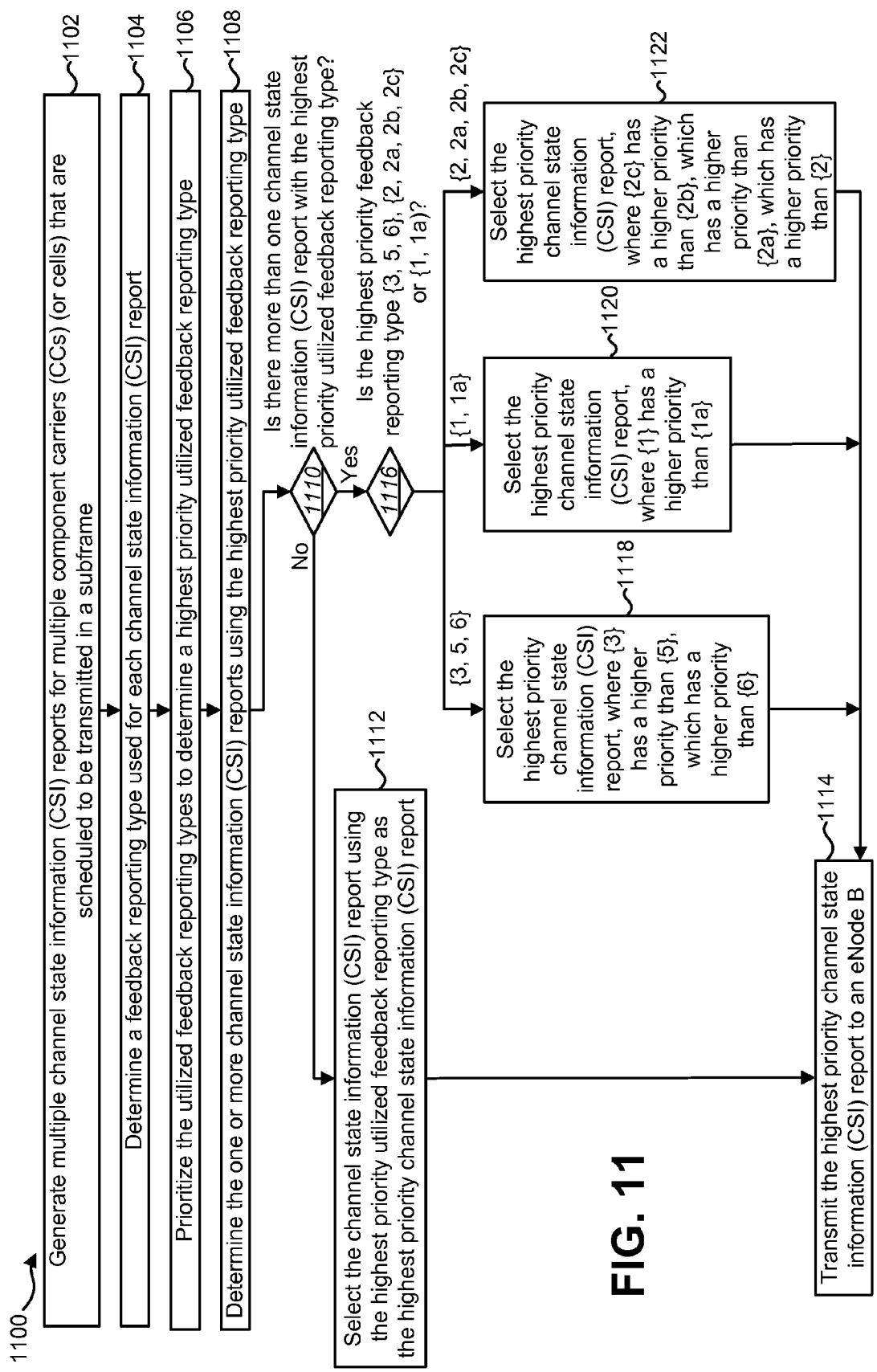
FIG. 11 is a flow diagram of another method for prioritizing channel state information (CSI) reports based on the feedback reporting type of each channel state information (CSI) report.

FIG. 11 is a flow diagram of another method 1100 for prioritizing channel state information (CSI) reports 236 based on the feedback reporting type 243 of each channel state information (CSI) report 236. The method 1100 may be performed by a user equipment (UE) 104. In one configuration, the method 1100 may be performed by a channel state information (CSI) selection module 257 on the user equipment (UE) 104. The user equipment (UE) 104 may generate 1102 multiple channel state information (CSI) reports 236 for multiple component carriers (CCs) 108 (or cells 185) that are scheduled to be transmitted in a subframe. Thus, a collision may occur between the multiple channel state information (CSI) reports 236.

The user equipment (UE) 104 may determine 1104 a feedback reporting type 243 used for each channel state information (CSI) report 236. A feedback reporting type 243 used by a channel state information (CSI) report 236 may be referred to as a utilized feedback reporting type 243. In other words, only those feedback reporting types 243 used by a channel state information (CSI) report 236 scheduled for transmission in the subframe are referred to as utilized feedback reporting types 243. The user equipment (UE) 104 may then prioritize 1106 the utilized feedback reporting types 243 to determine a highest priority utilized feedback reporting type 243 (i.e., the feedback reporting type 243 with the highest priority of all the feedback reporting types 243 used for channel state information (CSI) reports 236 scheduled for this particular subframe). The priorities of feedback reporting types 243 were discussed above in relation to FIG. 7.

The user equipment (UE) 104 may determine 1108 the one or more channel state information (CSI) reports 236 using the highest priority utilized feedback reporting type 243. The user equipment (UE) 104 may then determine 1110 whether more than one channel state information (CSI) report 236 is using the highest priority utilized feedback reporting type 243. In other words, the user equipment (UE) 104 may determine whether a collision may occur between channel state information (CSI) reports 236 for different component carriers (CCs) 108 (or cells 185) that are within the same feedback reporting type 243 subset. If there is only one channel state information (CSI) report 236 with the highest priority utilized feedback reporting type 243, the user equipment (UE) 104 may select 1112 the channel state information (CSI) report 236 with the highest priority utilized feedback reporting type 243 as the highest priority channel state information (CSI) report 251. The user equipment (UE) 104 may then transmit

1114 the highest priority channel state information (CSI) report 251 to an eNode B 102. In one configuration, the user equipment (UE) 104 may transmit 1114 the highest priority channel state information (CSI) report 251 to an eNode B 102 using the physical uplink control channel (PUCCH).

If more than one channel state information (CSI) report 236 is using the highest priority utilized feedback reporting type 243, the user equipment (UE) 104 may determine 1116 whether the highest priority utilized feedback reporting type 243 is {3, 5, 6}, {2, 2a, 2b, 2c} or {1, 1a}. If the highest priority utilized feedback reporting type 243 is {3, 5, 6}, the user equipment (UE) 104 may select 1118 the highest priority channel state information (CSI) report 251, where the feedback reporting type {3} 243 has a higher priority than the feedback reporting type {5} 243, which has a higher priority than the feedback reporting type {6} 243, since the feedback reporting type {3} 243 carries only rank indication (RI) 334 information and can be considered the most important for all transmission modes (as the other channel state information (CSI) reports 236 are conditioned on the rank indication (RI) 334 value).

Alternatively, for MIMO transmissions, the rank indication (RI) 334 and the rank can be prioritized, in which case the feedback reporting type {5} 243 is prioritized over the feedback reporting type {3} 243, which is prioritized over the feedback reporting type {6} 243. If precoder type indication (PTI) is considered more important than the first precoding matrix indicator (PMI) 332, the feedback reporting type {6} 243 may be prioritized over the feedback reporting type {3} 243, which is prioritized over the feedback reporting type {5} 243. Alternatively, the feedback reporting type {3} 243 may be prioritized over the feedback reporting type {6} 243, which may be prioritized over the feedback reporting type {5} 243. In one configuration, the rank indication (RI) 334 prioritizations may be combined, such that the feedback reporting type {3} 243 is prioritized over the feedback reporting types {5, 6} 243 or such that the feedback reporting types {5, 6} 243 are prioritized over the feedback reporting type {3} 243. The user equipment (UE) 104 may then transmit 1114 the highest priority channel state information (CSI) report 251 to an eNode B 102. In one configuration, the user equipment (UE) 104 may transmit 1114 the highest priority channel state information (CSI) report 251 to an eNode B 102 using the physical uplink control channel (PUCCH).

If the highest priority utilized feedback reporting type 243 is {1, 1a}, the user equipment (UE) 104 may select 1120 the highest priority channel state information (CSI) report 251, where the feedback reporting type {1} 243 has a higher priority than the feedback reporting type {1a} 243 if MIMO is not considered important. Alternatively, if MIMO is considered important, the feedback reporting type {1a} 243 may be prioritized over the feedback reporting type {1} 243, since the feedback reporting type {1a} 243 is used for eight antenna port transmission. The user equipment (UE) 104 may then transmit 1114 the highest priority channel state information (CSI) report 251 to an eNode B 102. In one configuration, the user equipment (UE) 104 may transmit 1114 the highest priority channel state information (CSI) report 251 to an eNode B 102 using the physical uplink control channel (PUCCH).

If the highest priority utilized feedback reporting type 243 is {2, 2a, 2b, 2c}, the user equipment (UE) 104 may select 1122 the highest priority channel state information (CSI) report 251, where the feedback reporting type {2c} 243 has a higher priority than the feedback reporting type {2b} 243, which has a higher priority than the feedback reporting type {2a} 243, which has a higher priority than the feedback reporting type {2} 243. The user equipment (UE) 104 may then transmit 1114 the highest priority channel state information (CSI) report 251 to an eNode B 102. In one configuration, the user equipment (UE) 104 may transmit 1114 the highest priority channel state information (CSI) report 251 to an eNode B 102 using the physical uplink control channel (PUCCH).

Figure 12:
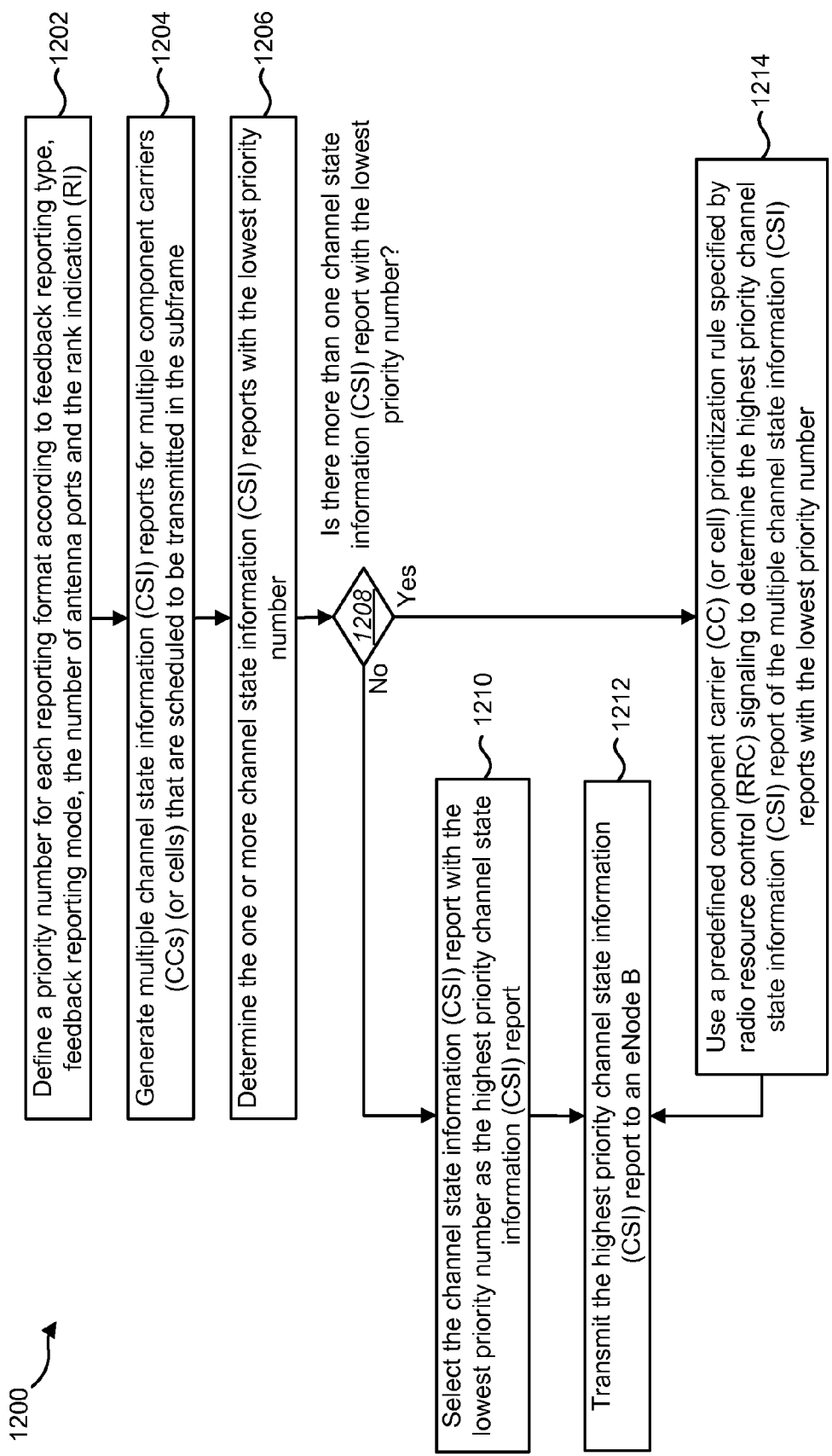
FIG. 12 is a flow diagram of a method for prioritizing channel state information (CSI) reports using priority numbers.

FIG. 12 is a flow diagram of a method 1200 for prioritizing channel state information (CSI) reports 236 using priority numbers 249. The method 1200 may be performed by a user equipment (UE) 104. In one configuration, the method 1200 may be performed by a channel state information (CSI) selection module 257 on a user equipment (UE) 104. The user equipment (UE) 104 may define 1202 a priority number 249 for each reporting format according to feedback reporting type 243, feedback reporting mode 253, the number of antenna ports 245 and the rank indication (RI) 334. One example of a table of priority numbers 249 was given above in Table 4. In Table 4, the feedback reporting type {3} 243 (using either feedback reporting mode 1-1 253 or feedback reporting mode 2-1 253), the feedback reporting type {5} 243 and the feedback reporting type {6} 243 have the highest priority (i.e., a priority of 1).

The user equipment (UE) 104 may generate 1204 multiple channel state information (CSI) reports 236 for multiple component carriers (CCs) 108 (or cells 185) that are scheduled to be transmitted in a subframe. Thus, a collision may occur between the multiple channel state information (CSI) reports 236. The user equipment (UE) 104 may determine 1206 the one or more channel state information (CSI) reports 236 with the lowest priority number 249. The user equipment (UE) 104 may then determine 1208 whether there is more than one channel state information (CSI) report 236 with the lowest priority number 249. If there is only one channel state information (CSI) report 236 with the lowest priority number 249, the user equipment (UE) 104 may select 1210 the channel state information (CSI) report 236 with the lowest priority number 249 as the highest priority channel state information (CSI) report 251. The user equipment (UE) 104 may then transmit 1212 the highest priority channel state information (CSI) report 251 to an eNode B 102. In one configuration, the user equipment (UE) 104 may transmit 1212 the highest priority channel state information (CSI) report 251 to an eNode B 102 using the physical uplink control channel (PUCCH).

If there is more than one channel state information (CSI) report 236 with the lowest priority number 249, the user equipment (UE) 104 may use 1214 a predefined component carrier (CC) 108 (or cell 185) prioritization rule specified by radio resource control (RRC) signaling to determine the highest priority channel state information (CSI) report 251 of the multiple channel state information (CSI) reports 236 with the lowest priority number 249. The user equipment (UE) 104 may then transmit 1212 the highest priority channel state information (CSI) report 251 to an eNodeB 102. In one configuration, the user equipment (UE) 104 may transmit 1212 the highest priority channel state information (CSI) report 251 to an eNode B 102 using the physical uplink control channel (PUCCH). One benefit of using priority numbers 249 to prioritize channel state information (CSI) reports 236 is that higher rank feedback may be prioritized over lower rank feedback.

Figure 13:
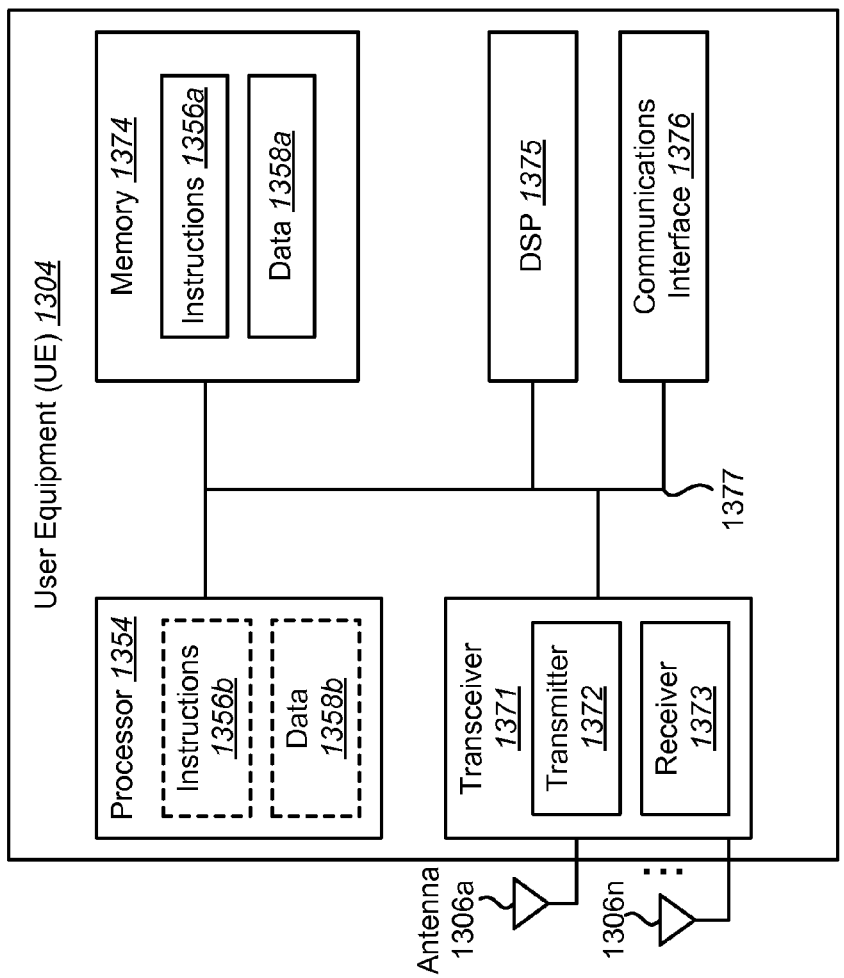
FIG. 13 illustrates various components that may be utilized in a user equipment (UE)

FIG. 13 illustrates various components that may be utilized in a user equipment (UE) 1304. The user equipment (UE) 1304 may be utilized as the user equipment (UE) 104 illustrated previously. The user equipment (UE) 1304 includes a processor 1354 that controls operation of the user equipment (UE) 1304. The processor 1354 may also be referred to as a CPU. Memory 1374, which may include both read-only memory (ROM), random access memory (RAM) or any type of device that may store information, provides instructions 1356*a* and data 1358*a* to the processor 1354. A portion of the memory 1374 may also include non-volatile random access memory (NVRAM). Instructions 1356*b* and data 1358*b* may also reside in the processor 1354. Instructions 1356*b* and/or data 1358*b* loaded into the processor 1354 may also include instructions 1356*a* and/or data 1358*a* from memory 1374 that were loaded for execution or processing by the processor 1354. The instructions 1356*b* may be executed by the processor 1354 to implement the systems and methods disclosed herein.

The user equipment (UE) 1304 may also include a housing that contains a transmitter 1372 and a receiver 1373 to allow transmission and reception of data. The transmitter 1372 and receiver 1373 may be combined into a transceiver 1371. One or more antennas 1306*a-n* are attached to the housing and electrically coupled to the transceiver 1371.

The various components of the user equipment (UE) 1304 are coupled together by a bus system 1377, which may include a power bus, a control signal bus, and a status signal bus, in addition to a data bus. However, for the sake of clarity, the various buses are illustrated in FIG. 13 as the bus system 1377. The user equipment (UE) 1304 may also include a digital signal processor (DSP) 1375 for use in processing signals. The user equipment (UE) 1304 may also include a communications interface 1376 that provides user access to the functions of the user equipment (UE) 1304. The user equipment (UE) 1304 illustrated in FIG. 13 is a functional block diagram rather than a listing of specific components.

Figure 14:
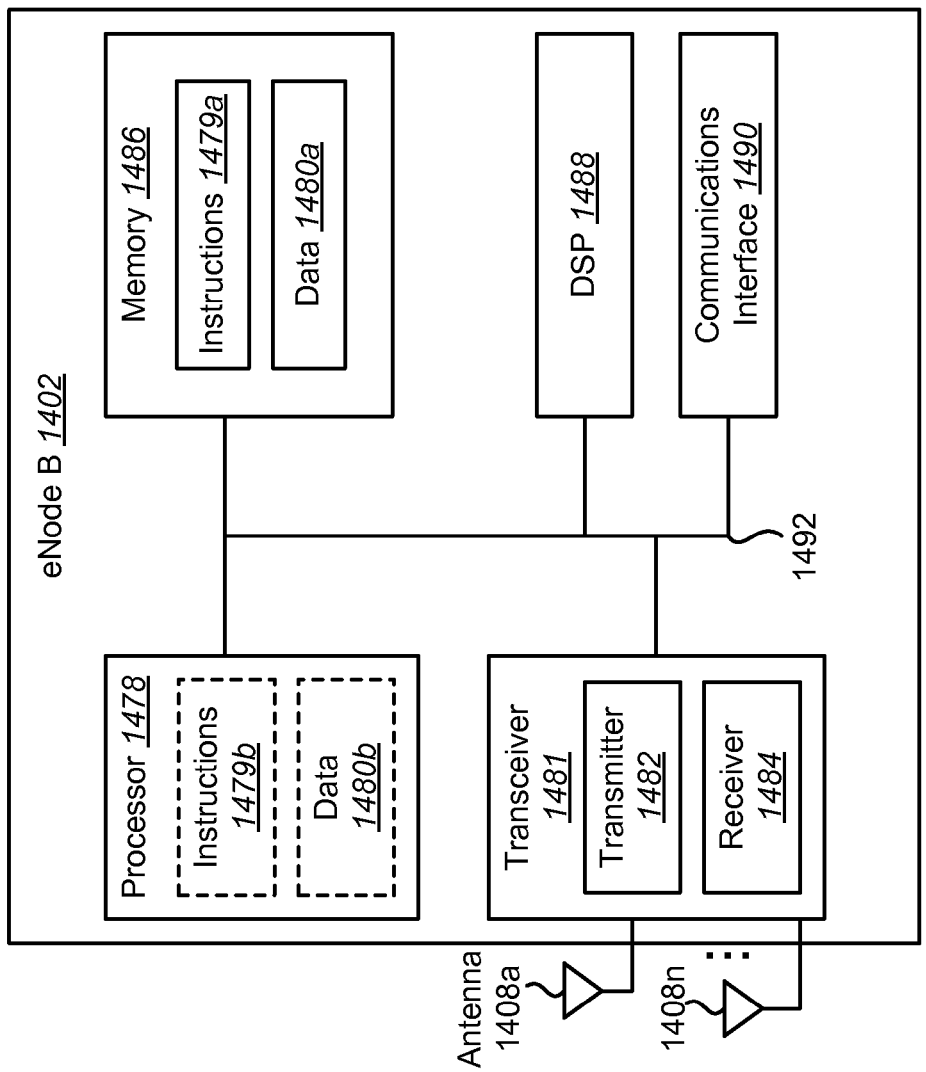
FIG. 14 illustrates various components that may be utilized in an eNode B.

FIG. 14 illustrates various components that may be utilized in an eNode B 1402. The eNode B 1402 may be utilized as the eNode B 102 illustrated previously. The eNode B 1402 may include components that are similar to the components discussed above in relation to the user equipment (UE) 1304, including a processor 1478, memory 1486 that provides instructions 1479*a* and data 1480*a* to the processor 1478, instructions 1479*b* and data 1480*b* that may reside in or be loaded into the processor 1478, a housing that contains a transmitter 1482 and a receiver 1484 (which may be combined into a transceiver 1481), one or more antennas 1408*a-n* electrically coupled to the transceiver 1481, a bus system 1492, a DSP 1488 for use in processing signals, a communications interface 1490 and so forth.

Unless otherwise noted, the use of '/' above represents the phrase "and/or."

The functions described herein may be implemented in hardware, software, firmware or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by the UE, the method comprising:
selecting a CSI report among multiple CSI reports for multiple cells based on priorities of CSI reports in case of a collision among the multiple CSI reports to be transmitted in a subframe, wherein PUCCH report type 3, 5, or 6 is prioritized over PUCCH report type 2, 2b, 2c, or 4 and PUCCH report type 2, 2b, 2c, or 4 is prioritized over PUCCH report type 1 or 1a, wherein PUCCH report type 3 supports rank indication (RI), PUCCH report type 5 supports RI and first precoding matrix indicator (PMI), PUCCH report type 6 supports RI and precoder type indication (PTI), PUCCH report type 2 supports wideband channel quality indicator (CQI) and wideband PMI, PUCCH report type 2b supports wideband CQI and second PMI, PUCCH report type 2c supports wideband CQI, first PMI, and second PMI, PUCCH report type 4 supports wideband CQI, PUCCH report type 1 supports Sub-band CQI, and PUCCH report type 1a supports Sub-band CQI and second PMI; and
transmitting the selected CSI report.

2. A user equipment (UE) comprising:
an operations module configured to:
select a CSI report among multiple CSI reports for multiple cells based on priorities of CSI reports in case of a collision among the multiple CSI reports to be transmitted in a subframe, wherein PUCCH report type 3, 5, or 6 is prioritized over PUCCH report type 2, 2b, 2c, or 4 and PUCCH report type 2, 2b, 2c, or 4 is prioritized over PUCCH report type 1 or 1a, wherein PUCCH report type 3 supports rank indication (RI), PUCCH report type 5 supports RI and first precoding matrix indicator (PMI), PUCCH report type 6 supports RI and precoder type indication (PTI), PUCCH report type 2 supports wideband channel quality indicator (CQI) and wideband PMI, PUCCH report type 2b supports wideband CQI and second PMI, PUCCH report type 2c supports wideband CQI, first PMI, and second PMI, PUCCH report type 4 supports wideband CQI, PUCCH report type 1 supports Sub-band CQI, and PUCCH report type 1a supports Sub-band CQI and second PMI; and
transmit the selected CSI report for the eNodeB.

3. A base station (eNodeB) comprising:
an operations module configured to:
select a CSI report among multiple CSI reports for multiple cells based on priorities of CSI reports in case of a collision among the multiple CSI reports to be transmitted in a subframe, wherein PUCCH report type 3, 5, or 6 is prioritized over PUCCH report type 2, 2b, 2c, or 4 and PUCCH report type 2, 2b, 2c, or 4 is prioritized over PUCCH report type 1 or 1a, wherein PUCCH report type 3 supports rank indication (RI), PUCCH report type 5 supports RI and first precoding matrix indicator (PMI), PUCCH report type 6 supports RI and precoder type indication (PTI), PUCCH report type 2 supports wideband channel quality indicator (CQI) and wideband PMI, PUCCH report type 2b supports wideband CQI and second PMI, PUCCH report type 2c supports wideband CQI, first PMI, and second PMI, PUCCH report type 4 supports wideband CQI, PUCCH report type 1 supports Sub-band CQI, and PUCCH report type 1a supports Sub-band CQI and second PMI; and
receive the selected CSI report.

4. A method performed by a base station (eNodeB), the method comprising:
selecting a CSI report among multiple CSI reports for multiple cells based on priorities of CSI reports in case of a collision among the multiple CSI reports to be transmitted in a subframe, wherein PUCCH report type 3, 5, or 6 is prioritized over PUCCH report type 2, 2b, 2c, or 4 and PUCCH report type 2, 2b, 2c, or 4 is prioritized over PUCCH report type 1 or 1a, wherein PUCCH report type 3 supports rank indication (RI), PUCCH report type 5 supports RI and first precoding matrix indicator (PMI), PUCCH report type 6 supports RI and precoder type indication (PTI), PUCCH report type 2 supports wideband channel quality indicator (CQI) and wideband PMI, PUCCH report type 2b supports wideband CQI and second PMI, PUCCH report type 2c supports wideband CQI, first PMI, and second PMI, PUCCH report type 4 supports wideband CQI, PUCCH report type 1 supports Sub-band CQI, and PUCCH report type 1a supports Sub-band CQI and second PMI; and
receiving the selected CSI report.

* * * * *